(12) United States Patent
Kurase

(10) Patent No.: US 7,301,565 B2
(45) Date of Patent: Nov. 27, 2007

(54) CORRECTION METHOD, CORRECTION DEVICE AND PHOTOGRAPHING DEVICE

(75) Inventor: Hiroyuki Kurase, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 908 days.

(21) Appl. No.: 10/438,913

(22) Filed: May 16, 2003

(65) Prior Publication Data

US 2003/0218683 A1 Nov. 27, 2003

(30) Foreign Application Priority Data

May 16, 2002 (JP) .............................. 2002-141278

(51) Int. Cl.
*H04N 5/228* (2006.01)
*G06K 9/40* (2006.01)

(52) U.S. Cl. ................... 348/222.1; 382/275

(58) Field of Classification Search ............... 382/275, 382/293, 254, 308; 348/345, 222.1, 335
See application file for complete search history.

(56) References Cited

U.S. PATENT DOCUMENTS

| | | | | |
|---|---|---|---|---|
| 5,231,673 A | * | 7/1993 | Elenga ........................ | 382/275 |
| 5,613,162 A | * | 3/1997 | Kabenjian ..................... | 710/22 |
| 6,476,869 B1 | * | 11/2002 | Sekine et al. ................ | 348/335 |
| 6,538,691 B1 | * | 3/2003 | Macy et al. ............. | 348/222.1 |
| 6,587,158 B1 | * | 7/2003 | Adams et al. ............... | 348/206 |
| 6,694,064 B1 | * | 2/2004 | Benkelman ................... | 382/284 |
| 6,747,702 B1 | * | 6/2004 | Harrigan ..................... | 348/241 |
| 7,227,573 B2 | * | 6/2007 | Stavely ..................... | 348/222.1 |

FOREIGN PATENT DOCUMENTS

| | | | |
|---|---|---|---|
| JP | 6-292207 A | | 10/1994 |
| JP | 10-271490 A | | 10/1998 |
| JP | 11-250238 A | | 9/1999 |
| JP | 11-250239 A | | 9/1999 |
| JP | 11-250240 A | | 9/1999 |
| JP | 11-252431 A | | 9/1999 |
| JP | 11331628 A | * | 11/1999 |
| JP | 2001-101396 A | | 4/2001 |

* cited by examiner

*Primary Examiner*—Lin Ye
*Assistant Examiner*—Jason Whipkey
(74) *Attorney, Agent, or Firm*—Birch, Stewart, Kolasch & Birch, LLP

(57) ABSTRACT

A photographing device divides corrected image data into four quadrants by x and y axes with a position corresponding to an optical center being an origin (base point), divides each of the quadrants into a plurality of strip regions so that the x axis direction width has a predetermined number of pixels processed, and performs correction for each of the strip regions on a line by line basis within a corresponding strip region (which will be referred to as a "short line" hereinafter in order to distinguish from one line on an entire image). The order of correction for short lines within each strip region starts from a short line which is closest to the x axis and successively proceeds in a direction away from the x axis.

21 Claims, 20 Drawing Sheets

SPOOL TYPE

BARREL TYPE

CORRECTION PATTERN 1

CORRECTION PATTERN 2

CORRECTION PATTERN 3

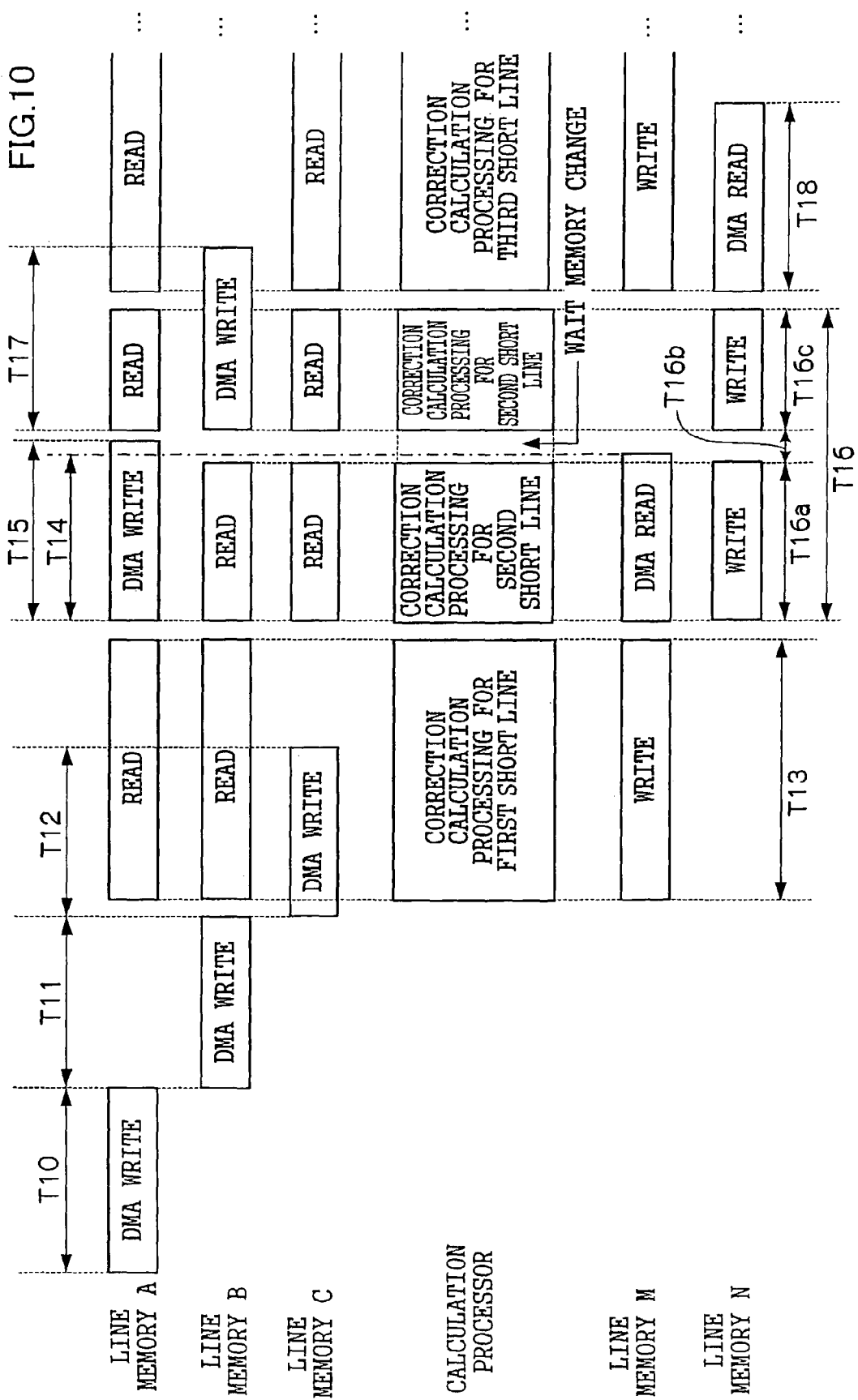

CORRECTION METHOD, CORRECTION DEVICE AND PHOTOGRAPHING DEVICE

BACKGROUND OF THE INVENTION

1. Field of the Invention

The present invention relates to a correction method and a correction device for correcting an optical distortion upon digital image data, and a photographing device with such correction device.

2. Description of the Related Art

According to a photographing device such as a silver salt camera or a digital camera, a subject image is photographed through an optical lens and an image representing the subject image is obtained. In such photographing device, the periphery of the obtained image is distorted because of refraction of the lens. This distortion is generally referred to as an optical distortion. The lens used for the photographing device is structured so as to eliminate such optical distortion.

In the case that the lens is a zoom lens, however, it is difficult to correct a tele end and a wide end by the same lens structure. For this reason, large optical distortion easily occurs. In the case of a single vision lens, in order to perform correction, a lens must be made of expensive materials or a number of lens structures must be increased. Thus, a lens structure which is thin and inexpensive is difficult to be realized. In the case of the thin and inexpensive lens structure, an optical distortion remains.

In the case that an obtained image is recorded in a film as in the case of a silver salt camera, an image cannot be corrected once recorded. For this reason, an optical distortion is determined depending on the performance of a lens. On the other hand, when an image is obtained as digital data and recorded in a recording media as in the case of a digital camera, an image can be corrected by a calculation processing even after being recorded. Techniques for correcting an optical distortion have been conventionally suggested in the field of digital camera.

An optical distortion is classified into two types, i.e., "a spool type" in which corner portions of an image extend to the outside as shown in FIG. 1A and "a barrel type" in which the corner portions are shrunk as shown in FIG. 1B. It is generally known that a distortion amount (a displacement amount) is determined by the distance from an optical center in both of the aforementioned types. If the displacement amount is linear, an image is simply enlarged/reduced. In actuality, however, the displacement amount draws a non-linear curve as shown in FIG. 1C. In the case of positive displacement amount, the "spool type" can be obtained because pixels are shifted from their original positions in a direction away from the optical center. In the case of negative displacement amount, the "barrel type" can be obtained because the pixels are placed so as to approach the optical center from their original positions.

Japanese Patent Application Laid-Open (JP-A) Nos. 6-292207 and 10-271490 describe a technique for correcting such optical distortions. According to this technique, a correction amount is calculated from coordinates on an image, and the correction amount is stored as a table in a memory, so that correction is performed. According to the technique, however, the memory for storing the table for the correction amount requires a storage capacity corresponding to the size of image data. For this reason, as the image size is increased, the storage capacity required for this memory is also increased. As a result, a work area in the memory is reduced and a price of the memory is increased.

A technique for solving such drawbacks is described in JP-A No. 11-252431. According to this technique, a correction amount is represented by an approximate expression and then corrected. Namely, it is generally known that a displacement amount of optical distortion as shown in FIG. 1C can be approximately represented by a polynominal expression. An inverse number of this polynominal expression is used as a correction expression. In this technique, correction amounts for the respective coordinates need not held in a table. Only parameters (coefficients for the polynominal expression) are stored in a memory and thus all of the coordinates of a uncorrected image can correspond to the coordinates of a corrected image by calculation. Generally, pixel data of a required coordinate is appropriately read from a memory storing a uncorrected image and pixel data of a corrected image is generated. It takes a long time for a CPU to get an access to the memory and perform a correction processing even for a processing upon only one pixel. Therefore, much longer time is required to process the entire image.

As described in JP-A No. 2001-101396, data which is necessary for correction is DMA transferred from a memory storing a uncorrected image and the transferred data is stored in an internal memory. As a result, a speed can be increased.

According to this technique, however, DMA transfer information, a correction coefficient and the coordinate of uncorrected data must be produced in advance for correction. Further, such information must be DMA transferred. As a result, there arises a problem in that a large capacity of memory is required.

The displacement amount of an optical distortion increases as being away from an optical center. For this reason, the number of lines of pixel data of a uncorrected image required to generate corrected pixels of one line may vary depending on the position that the correction is performed. Thus, an addressing for DMA transfer must be set for each of lines. As a result, there arises a problem in that processings become complicated.

SUMMARY OF THE INVENTION

An object of the present invention is to provide a correction method, a correction device and a photographing device that can easily correct an optical distortion for digital image data which indicates a subject image photographed through an optical lens and reduce a capacity of a memory required for this correction.

A correction method of the invention comprises the steps of: dividing digital image data, which indicates a subject image photographed via an optical lens and in which a plurality of pixel rows each of which includes a plurality of pixels arranged in a line direction are arranged in an orthogonal direction orthogonal to the line direction, into four quadrants by an axis in the line direction and an axis in the orthogonal direction which pass through an optical center corresponding to a center of the optical lens, dividing each of the quadrants into a plurality of strip regions by a plurality of lines in the orthogonal direction, and correcting an optical distortion successively from a pixel row which is closest to the axis in the line direction or a pixel row which is furthest from the axis in the line direction for each of the strip regions; and performing data transfer with an image data storing component, which stores the digital image data, according to a corresponding correction order for each of pixels arranged continuously in the line direction.

According to the correction method of the invention, correction for the optical distortion of the digital image data is performed as follows. Namely, the digital image data is divided into four quadrants by the axis in the line direction and the axis in the orthogonal direction which pass through the optical center corresponding to the center of the optical lens. Further, each of the quadrants is divided into the plurality of strip regions. Then, correction is successively performed for each of the divided strip regions from a pixel row which is closest to the axis in the line direction or a pixel row which is furthest from the axis in the line direction. By the correction being performed according to such order, when data transfer is performed with the image data storing component, in order to, for example, obtain pixel data required for correction for one pixel row within the strip region, a first address to be accessed in the image data storing component and the movement width to an address to be moved to after one transfer (transfer of data corresponding to a predetermined number of pixels continuously arranged in the line direction) are simply designated. Thus, control for the data transfer becomes simplified.

According to the above-described correction method, the optical distortion may be approximately represented by a polynominal expression, pixels for corrected digital image data may be interpolated with uncorrected digital image data and thus correction for optical distortion can be performed upon the digital image data.

According to the correction method, when the optical distortion is a spool type optical distortion, preferably, correction is successively performed, for each of the strip regions, from a pixel row closest to the axis in the line direction to a pixel row furthest from the axis in the line direction. When the optical distortion is a barrel type optical distortion, preferably, correction is successively performed, for each of the strip regions, from a pixel row furthest from the axis in the line direction to a pixel row closest to the axis in the line direction. In this case, within each pixel row within the strip region, correction is preferably performed successively from a pixel which is closest to the optical center.

According to the correction method, when the optical distortion is a spool type optical distortion, preferably, correction is successively performed from a strip region which is closest to the optical center within each of the quadrants, and when the optical distortion is a barrel type optical distortion, preferably, correction is successively performed from a strip region which is furthest from the optical center within each of the quadrants.

According to the correction method, the polynominal expression which does not include a term in which variable is of an odd order (i.e., a polynominal expression structured only by a term in which variable is of an even order and a constant term) is preferably used as a polynominal expression which approximates the optical distortion.

According to the correction method, one of nearest neighbor interpolation, bi-linear interpolation and cubic convolution interpolation may be used as the interpolation method. Further, one of a correction pattern in which correction is performed so that the optical center is fixed and a peripheral portion is moved in the digital image data and a correction pattern in which correction is performed so that an intermediate portion between the optical center and the peripheral portion or the peripheral portion is fixed and an optical center side is moved in the digital image data may be used as a correction pattern.

A correction device according to a first aspect of the invention comprises a correction component which divides digital image data, which indicates a subject image photographed via an optical lens and in which a plurality of pixel rows each of which includes a plurality of pixels arranged in a line direction are arranged in an orthogonal direction orthogonal to the line direction, into four quadrants by an axis in the line direction and an axis in the orthogonal direction which pass through an optical center corresponding to a center of the optical lens, divides each of the quadrants into a plurality of strip regions by a plurality of lines in the orthogonal direction, and corrects an optical distortion successively from a pixel row which is closest to the axis in the line direction or a pixel row which is furthest from the axis in the line direction for each of the strip regions; an internal uncorrected data storing component which stores uncorrected pixels required for generating at least one corrected pixel row within the strip region; and an uncorrected data transferring component which DMA transfers uncorrected digital image data from an image data storing component, which stores the digital image data, to the internal uncorrected data storing component according to a correction order in which correction is performed by the correction component, for each of pixels continuously arranged in the line direction.

In the correction device according to the first aspect of the invention, the correction component divides the digital image data into four quadrants by the axis in the line direction and the axis in the orthogonal direction which pass through the optical center corresponding to the center of the optical lens. Further, the correction component divides each of the quadrants into strip regions. The correction component successively performs correction for each of the strip regions from a pixel row which is closest to the axis in the line direction or a pixel row which is furthest from the axis in the line direction. The uncorrected data transferring component DMA transfers the uncorrected digital image data to the internal uncorrected data storing component according to the correction order in which correction is performed by the correction component, for each of pixels continuously arranged in the line direction. Uncorrected pixel data, which is a part of the uncorrected digital image data and is required for generating at least one corrected pixel row within a strip region, is stored in the internal uncorrected data storing component. The correction component appropriately reads data required for generating corrected pixels from the internal uncorrected data storing component. For this reason, the correction component can generate one corrected pixel row within a strip region.

As described above, it is efficient because the pixel data required for generating one corrected pixel row within a strip region is DMA transferred for each of pixels continuously arranged in the line direction. DMA transfer from the image data storing component to the internal uncorrected data storing component is performed by designating only a first address to be accessed in the image data storing component and the movement width to an address to be moved to after one DMA transfer (i.e., transfer of data corresponding to a predetermined number of pixels continuously arranged in the line direction required for generating one pixel row within a strip region). Thus, DMA control processing becomes simplified. As a result, unlike prior arts, DMA transfer information, a correction coefficient and the coordinate of uncorrected data need not to be transferred for correction. Moreover, the capacity of memory can be reduced.

In the correction device according to the first aspect, the correction component may be structured so as to correct the optical distortion by approximating the optical distortion with a polynominal expression and interpolating pixels for corrected digital image data with uncorrected digital image data.

Further, the correction device according to the first aspect may be used for a photographing device that photographs a subject image via an optical lens and stores the digital image data into the image data storing component.

When the corrected digital image data is finally stored in the image data storing component that the uncorrected digital image data was stored, the following aspect will be considered. Namely, the above-described correction device may further comprise an internal corrected data storing component which stores corrected pixels continuously arranged in the line direction corresponding to at least one corrected pixel row within a strip region; and a corrected data transferring component which DMA transfers the corrected digital image data from the internal corrected data storing component to the image data storing component for each of pixels continuously arranged in the line direction.

When corrected pixels continuously arranged in the line direction corresponding to corrected one pixel row within a strip region have been generated, the corrected digital image data corresponding to the pixels continuously arranged in the line direction is DMA transferred to the image data storing component. Thus, it is efficient. In DMA transfer from the internal corrected data storing component to the image data storing component, only a first address to be accessed in the image data storing component and a movement width to an address to be moved to after one DMA transfer (i.e., transfer of data corresponding to one pixel row within a strip region) may be designated. For this reason, DMA control processing is simplified.

In the correction device according to the first aspect, preferably, the correction component successively performs correction, for each of the strip regions, from a pixel row closest to the axis in the line direction to a pixel row furthest from the axis in the line direction when the optical distortion is a spool type optical distortion, and successively performs correction, for each of the strip regions, from a pixel row furthest from the axis in the line direction to a pixel row closest to the axis in the line direction when the optical distortion is a barrel type optical distortion. In this case, it is preferable for the correction component to successively perform correction from a pixel closest to the optical center within each pixel row in the strip region.

In the correction device according to the first aspect, it is preferable for the correction component to successively perform correction from a strip region which is closest to the optical center within each of the quadrants when the optical distortion is a spool type optical distortion. Further, it is preferable for the correction component to successively perform correction from a strip region which is furthest from the optical center within each of the quadrants when the optical distortion is a barrel type optical distortion.

In the correction device according to the first aspect, the correction component may use a polynominal expression which does not include a term in which variable is of an odd order (i.e., a polynominal expression which is structured by only a term in which variable is of an even order and a constant term) as a polynominal expression which approximates the optical distortion.

In the correction device according to the first aspect, the correction component may use one of nearest neighbor interpolation, bi-linear interpolation and cubic convolution interpolation as the interpolation method. The correction component may use, as a correction pattern, one of a correction pattern in which correction is performed so that the optical center is fixed and a peripheral portion is moved in the digital image data and a correction pattern in which correction is performed so that an intermediate portion between the optical center and the peripheral portion or the peripheral portion is fixed and an optical center side is moved in the digital image data.

A correction device according to a second aspect of the invention divides digital image data into a plurality of strip regions and corrects an optical distortion for each of the strip regions.

In the correction device according to the second aspect, the optical distortion may be corrected by approximating the optical distortion by a polynominal expression and interpolating pixels for corrected digital image data with uncorrected digital image data.

A photographing device of the invention comprises the correction device according to the second aspect; an optical lens which images a subject image; and an image data storing component which stores the digital image data.

BRIEF DESCRIPTION OF THE DRAWINGS

FIG. 10 is a timing chart illustrating the operations of respective sections of a distortion corrector of the first embodiment.

DETAILED DESCRIPTION OF THE INVENTION

Firstly, a principal for correcting an optical distortion that is applied to embodiments of the present invention will be described.

Figure 1A:
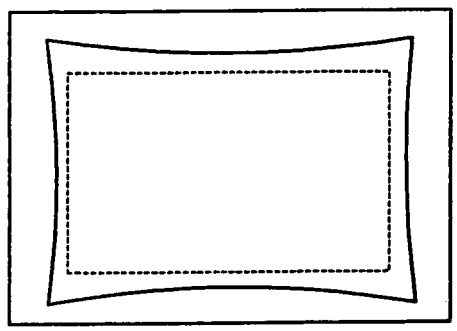
FIG. 1A is a view illustrating the configuration of a spool type optical distortion.
Figure 1B:
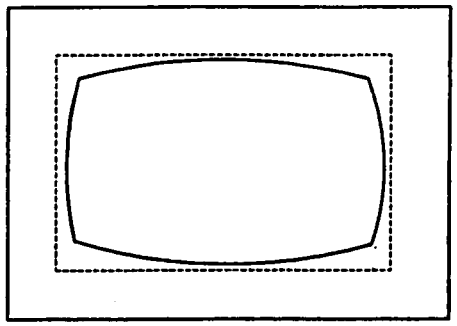
FIG. 1B is a view illustrating the configuration of a barrel type optical distortion.
Figure 1C:
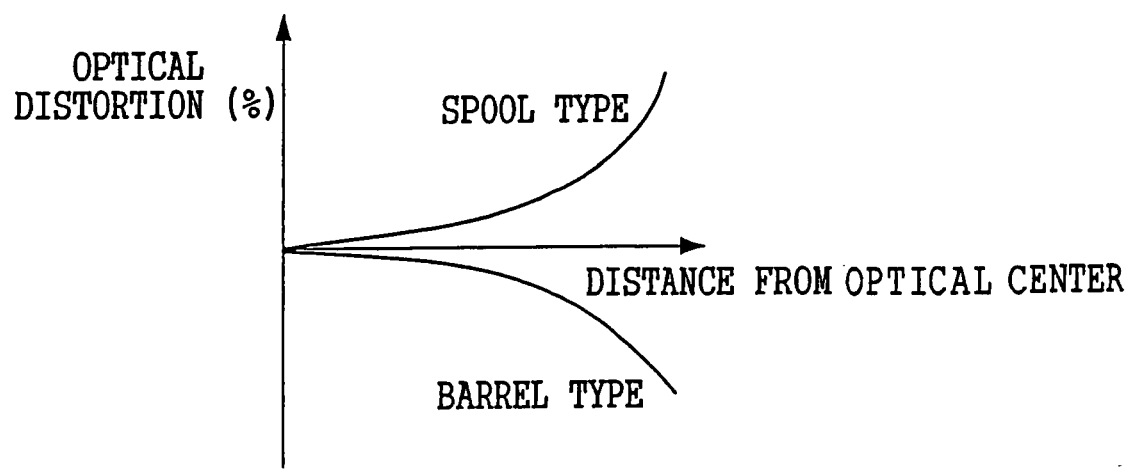
FIG. 1C is a graph illustrating displacement amounts (optical distortions) of the spool type optical distortion and the barrel type optical distortion.

As shown in FIG. 1C, an optical distortion curve which illustrates a displacement amount due to an optical distortion can be approximately represented by a multidimensional function of a distance from the center of an image (an optical center). As an example, the displacement amount due to the optical distortion is represented by the quaternary function represented by the following expression (1)

$$F(d) = \alpha \times d^4 + \beta \times d^2 + \gamma \tag{1}$$

wherein d indicates a distance from the optical center and α, β and γ indicate coefficients.

When a coordinate of a pixel on an image without optical distortion, i.e., on a corrected image is indicated by (x, y) (x and y are integers), a coordinate (X, Y) of a uncorrected image corresponding to the coordinate (x, y) is represented by the following expression (2).

$$(X, Y) = (x \times F(d), y \times F(d)), d = (x^2 + y^2)^{1/2} \tag{2}$$

As is apparent from the expression (2), if a term in which the distance d from the optical center is of an odd term is included in the above expression (1), a square root calculation is required for calculating the term containing d. Thus, the structure of hardware becomes complicated. By omitting terms in which d is of odd order in order to represent the optical distortion by a function (polynominal expression) containing only terms in which d is of even order, as in the expression (1), the square root calculation can be avoided. Then, the structure of a circuit can be simplified.

Figure 2A:
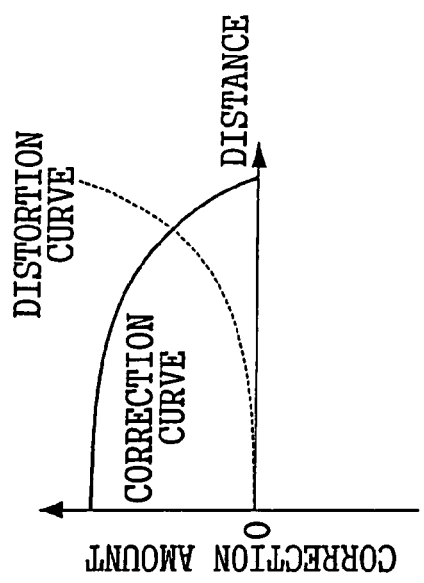
FIGS. 2A, 2B and 2C are graphs illustrating types of correction pattern.
Figure 2B:
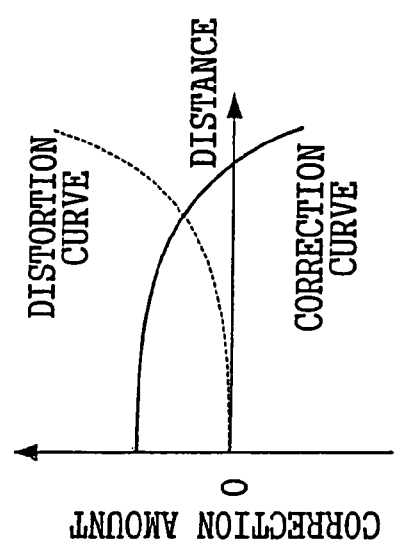
Figure 2C:
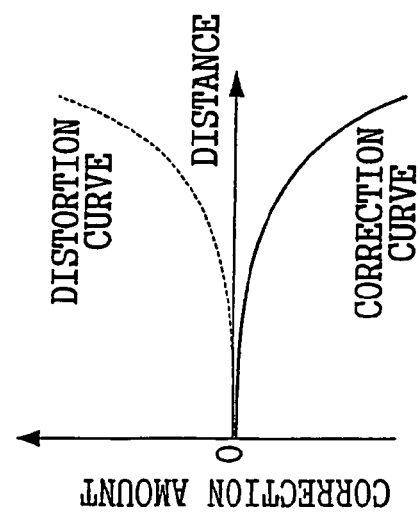

A correction curve for correcting an optical distortion may be drawn so as to be reverse with respect to the optical distortion curve. The correction curve is roughly classified into three patterns. For example, contrary to the optical distortion curve, the curve for correcting a spool type optical distortion is drawn so as to be always toward lower right (so as to always obtain a negative differential value). As shown in FIGS. 2A, 2B and 2C, three types of correction patterns may be considered for the curve for correcting a spool type optical distortion.

Namely, as shown in FIG. 2A, there is provided a correction pattern (correction pattern 1) that the optical center is fixed and correction is performed so that a peripheral portion is attracted toward the side of the optical center. Further, as shown in FIGS. 2B and 2C, correction patterns (correction patterns 2 and 3) that an intermediate portion between the optical center and the peripheral portion, e.g., a peripheral neighborhood or the peripheral portion is fixed and then correction is performed so that the side of the optical center is moved are provided.

The type of such correction patterns is determined by the coefficient γ in the aforementioned expression (1) Namely, the coefficients α and β in the expression (1) are determined on a basis of an actual optical distortion. The coefficient γ in the expression (1) is set according to the correction pattern used. The correction pattern 1 is obtained when γ=0. The correction patterns 2 and 3 are obtained when γ>0.

Correction for an optical distortion may be performed in such a manner that the coordinate (X, Y) of a uncorrected image corresponding to the coordinate (x, y) of a corrected image is calculated and then pixel data P at the coordinate (X, Y) of the uncorrected image is moved to the coordinate (x, y) of the corrected image. Nevertheless, the coordinate (X, Y) of the uncorrected image calculated by the aforementioned expression (2) is usually not an integer. That is to say, corresponding pixel data does not exist in the uncorrected image.

The pixel data P corresponding to the calculated coordinate (X, Y) of the uncorrected image must be calculated by interpolation from actually existing pixel data in a vicinity of the coordinate (X, Y) of the uncorrected image and then interpolated.

As the interpolation method under such state, nearest neighbor interpolation and bi-linear interpolation may be provided.

Figure 3:
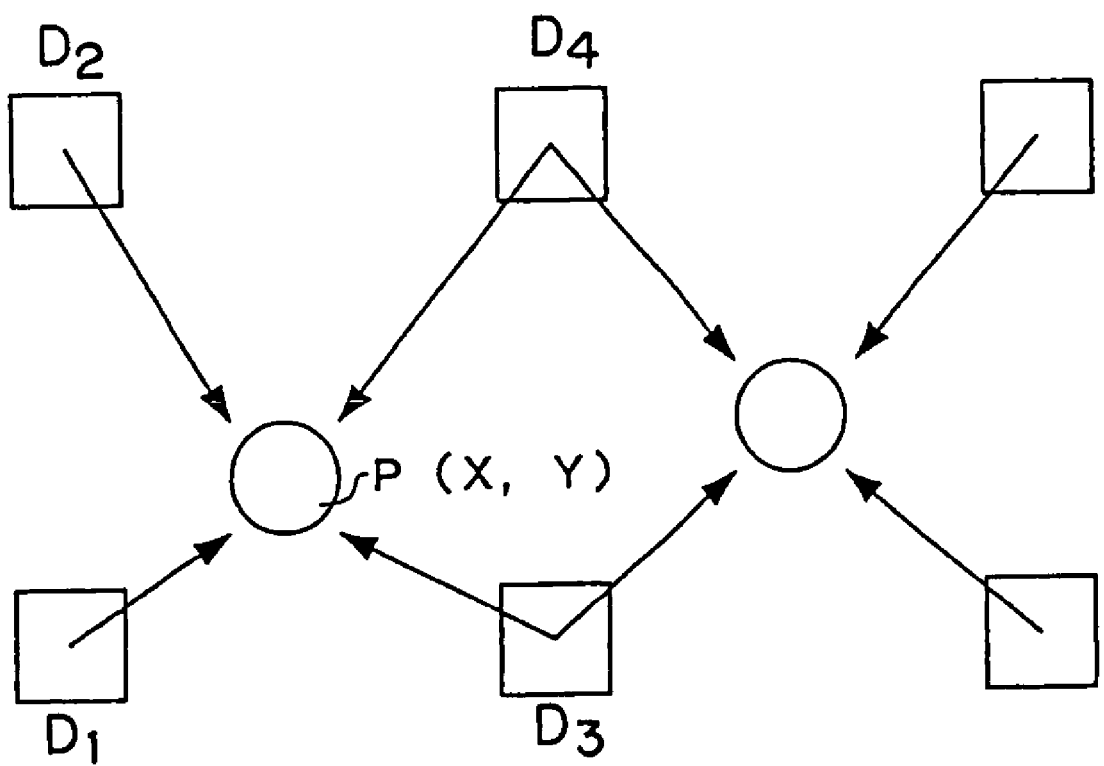
FIG. 3 is a conceptual diagram for explaining bi-linear interpolation.

According to the bi-linear interpolation, as shown in FIG. 3, pixel data P corresponding to the coordinate (X, Y) of a uncorrected image is interpolated by data D1, D2, D3 and D4 for four neighbor pixels on the periphery of the coordinate (X, Y) on the uncorrected image. Specifically, weights are determined depending on the distance from the coordinate of the uncorrected image and a weighted average of the pixel data D1, D2, D3 and D4 for four pixels is calculated.

An integer portion in the coordinate (X, Y) of the uncorrected image that is calculated by the above expression (2) and corresponds to the coordinate (x, y) of the corrected image is indicated by (intx, inty) and a decimal portion in the coordinate (X, Y) is indicated by (Δx, Δy). Then, coordinates $D_1, D_2, D_3$ and $D_4$ of the data for four neighbor pixels on the periphery of the coordinate of the uncorrected image are indicated by (intx, inty), (intX, intY+1), (intX+1, intY) and (intX+1, intY+1), respectively. Weights for the pixel data $D_1, D_2, D_3$ and $D_4$ are indicated by (1−Δx)×(1−Δy), (1−Δx)× Δy, Δx×(1−Δy) and Δx×Δy, respectively. The pixel data P to be calculated is represented by the following expression (3)

when pixel data values for four neighbor pixels on the uncorrected image are indicated by $D_1$, $D_2$, $D_3$ and $D_4$.

$$P=D_1\times(1-\Delta x)\times(1-\Delta y)+D_2\times(1-\Delta x)\times\Delta y+D_3\times\Delta x\times(1-\Delta y)+D_4\times\Delta x\times\Delta y \quad (3)$$

According to the nearest neighbor interpolation, the pixel data P at the coordinate of the uncorrected image is interpolated by data for a pixel which is the nearest to the coordinate of the uncorrected image.

Namely, the coordinate (X, Y)=(x×F(d), y×F(d)) of the uncorrected image corresponding to the coordinate (x, y) of the corrected image is calculated by the above expression (2). Then, the decimal portion of the coordinate (X, Y) of the uncorrected image is rounded off to obtain an integer coordinate. Pixel data for the uncorrected image at the integer coordinate is used as the pixel data P for the coordinate (X, Y) of the uncorrected image.

If a calculation processing can be performed at high speed, interpolation may be performed by cubic convolution interpolation. In this case, calculation becomes more complicated, but images with higher quality can be obtained.

Even if any of the interpolation methods is used, the coordinate (X, Y) of the uncorrected image corresponding to the coordinate (x, y) of the corrected image is firstly calculated. Further, the pixel data P is calculated by using the pixel data for the uncorrected image in a vicinity of the calculated coordinate (X, Y) according to the corresponding interpolation method. Then, the calculated pixel data P is used as the pixel data for the coordinate (x, y) of the corrected image. In this way, an optical distortion can be corrected.

The case of applying the invention to a digital camera will be described hereinafter.

FIRST EMBODIMENT

According to a first embodiment, an optical distortion is corrected by the correction pattern 1. The bi-linear interpolation is utilized as the interpolation method.

(Overall Structure)

The structure of a digital camera 10 relating to this embodiment will be firstly described with reference to FIG. 4.

Figure 4:
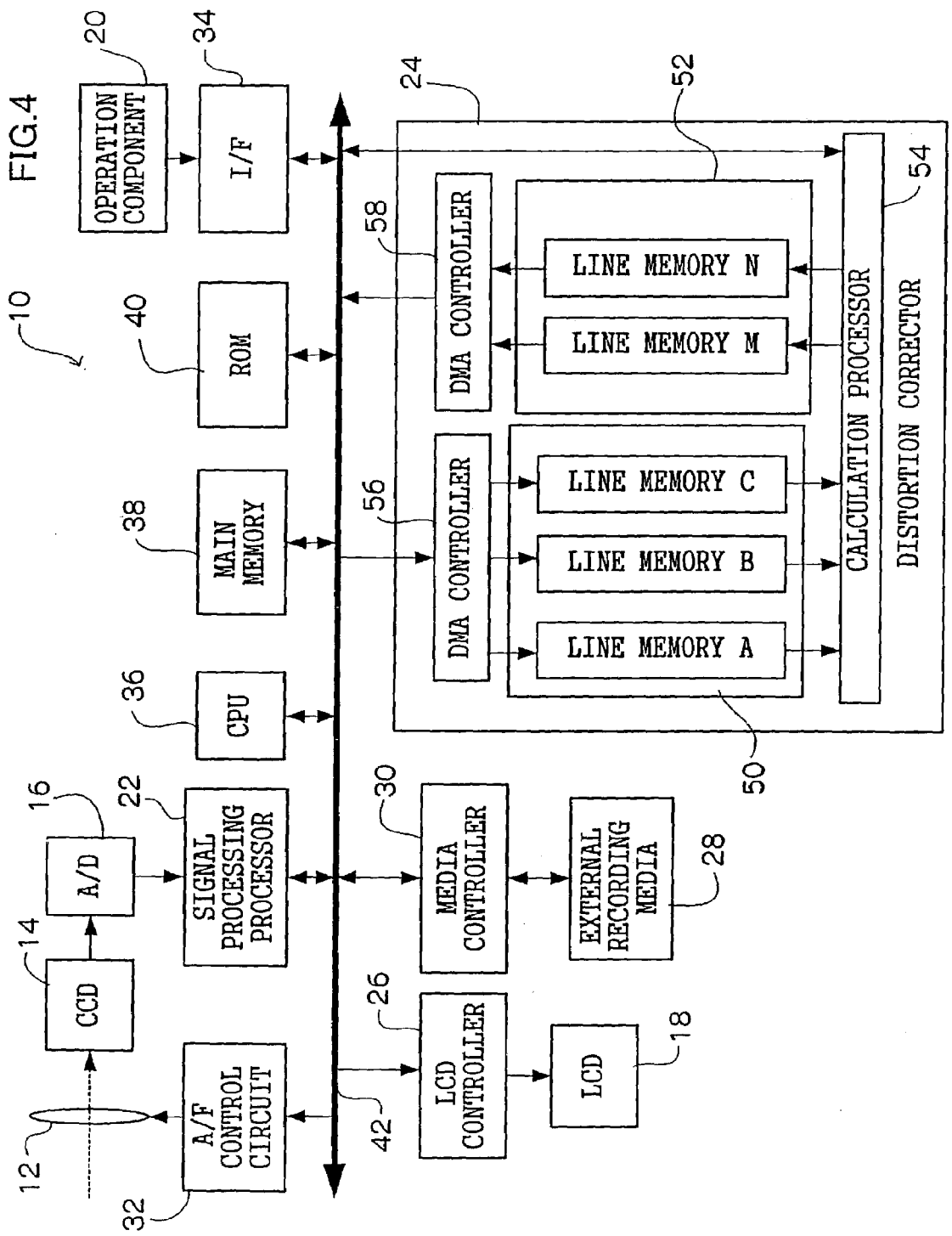
FIG. 4 is a block diagram illustrating the structure of a digital camera relating to a first embodiment.

As shown in FIG. 4, the digital camera 10 relating to this embodiment includes an optical unit 12 serving as an optical lens. The optical unit 12 images a subject image. The digital camera 10 includes a CCD (Charge Coupled Device) 14. The CCD 14 is placed behind the optical unit 12 in its optical axis. The digital camera 10 includes an A/D converter 16. The A/D converter 16 converts an analog signal into a digital signal. The digital camera 10 includes a LCD (liquid crystal display) 18. The LCD 18 displays images obtained by photographing with the digital camera 10 and various types of information. The digital camera 10 includes an operation component 20 such as a release button, a mode switching switch and a power source switch. The operation component 20 is operated by a photographer.

Further, the digital camera 10 includes a signal processing processor 22. The signal processing processor 22 performs a predetermined processing upon an inputted digital signal and then generates digital image data. The digital camera 10 includes a distortion corrector 24 serving as a correction device of the invention. The distortion corrector 24 corrects an optical distortion of the digital image data. The digital camera 10 has a LCD controller 26. The LCD controller 26 controls display onto the LCD 18. The digital camera 10 has a media controller 30. The media controller 30 controls reading/writing of various information from/onto an external recording media 28 such as a smart media, an IC card, a CD-R or a CD-RW or the like. The digital camera 10 includes an A/F control circuit 32. The A/F control circuit 32 adjusts optical zoom magnification and focus of the optical unit 12. The digital camera 10 includes an I/F device 34 with the operation component 20. The digital camera 10 also includes a CPU (central processing unit) 36. The CPU 36 governs the overall control of the digital camera 10. The digital camera 10 includes a main memory 38 serving as an image data storing component of the invention. The main memory 38 mainly stores digital image data obtained by photographing with the CCD 14. The digital camera 10 has a ROM 40. Various types of programs and parameters and the like are stored in the ROM 40 in advance.

The signal processing processor 22, the distortion corrector 24, the LCD controller 26, the media controller 30, the A/F control circuit 32, the I/F device 34, the CPU 36, the main memory 38 and the ROM 40 are connected with each other via a bus 42.

The optical unit 12 has a zoom lens group and a focus lens (not shown). The optical unit 12 also has an unillustrated lens movement mechanism. The lens movement mechanism moves the zoom lens group and the focus lens in an optical axis direction. The optical unit 12 is structured as a zoom lens which is capable of changing its focal distance (magnification). The optical unit 12 is connected to the A/F control circuit 32. In the optical unit 12, in order to obtain a desired zoom magnification, the zoom lens group is moved in its optical axis direction by control of the A/F control circuit 32 (focal distance variable lens). In the optical unit 12, the focus lens is moved in its optical axis direction by the control of the A/F control circuit 32 so that entering light which has transmitted through the lens and indicates a subject image is imaged onto the light receiving surface of the CCD 14 (autofocus (AF) mechanism). Then, at the CCD 14, a subject is photographed on a basis of the entering light which has passed through the lens of the optical unit 12 and indicates the subject image. The CCD 14 outputs an analog signal indicating the subject image.

The output end of the CCD 14 is connected to the A/D converter 16. The A/D converter 16 converts the analog image signal which is outputted from the CCD 14 and indicates the subject image into a digital image signal.

The output end of the A/D converter 16 is connected to the signal processing processor 22. An image signal which is obtained by the CCD 14 at a time of photographing and indicates the subject image is converted from an analog signal into a digital signal. Then, the converted digital signal is inputted to the signal processing processor 22. The image signal converted into the digital signal is treated as digital image data. Specifically, at the signal processing processor 22, various types of correction processings such as a white balance adjustment, a gamma correction and a sharpness correction, and a predetermined digital signal processing such as a YC conversion processing for converting RGB data into a YC signal are performed upon the inputted digital image data. The digital image data subjected to YC conversion in the signal processing processor 22 is temporarily stored, as uncorrected image data, in the main memory 38 via the bus 42.

Generally, a mass memory such as an SRAM or an SDRAM may be used for the main memory 38. According to such memories, continuous access in a line direction is fast but access to discontinuous addresses is slow.

The distortion corrector 24 is used for correcting an optical distortion of the uncorrected image data stored in the main memory 38. The distortion corrector 24 reads out the uncorrected image data from the main memory 38 and corrects its optical distortion. The distortion corrector 24 writes corrected image data into the main memory 38. Details of the distortion corrector 24 will be described later.

According to the digital camera 10, the corrected image data is compressed in an unillustrated compression/decompression circuit by a predetermined compression system (e.g., a JPEG). Then, in the digital camera 10, the corrected image data may be stored in the external recording media 28 via the media controller 30.

The above-described LCD 18 is connected to the LCD controller 26. The LCD 18 is operated under control of the LCD controller 26. At the time of photographing, the LCD controller 26 reads out the corrected image data via the bus 42 from the main memory 38. The LCD controller 26 displays the corrected image data onto the LCD 18. In order to reproduce an image, the digital image data to be reproduced stored in the external recording media 28 is read out. Further, the digital image data is decompressed in the unillustrated compression/decompression circuit. Then, the digital image data is displayed onto the LCD 18 by the control of the LCD controller 26.

The operation component 20 including various types of switches and buttons which is operated by a photographer is connected to the I/F device 34. The CPU 36 can always grasp the state of the operation component 20 operated by the photographer through the I/F device 34. The CPU 36 controls operations of the above-described sections according to the grasped operational state.

(Details of Distortion Corrector)

Next, the distortion corrector 24 will be described in detail.

As shown in FIG. 4, the distortion corrector 24 includes internal memories 50 and 52. The internal memories 50 and 52 store data for reading/writing with the main memory 38. The distortion corrector 24 also includes a calculation processor 54 serving as a correction component. The calculation processor 54 corrects an optical distortion of an image by calculation. The distortion corrector 24 includes a DMA controller 56. The DMA controller 56 governs DMA (Direct Memory Access) transfer between the main memory 38 and the internal memory 50. The distortion corrector 24 includes a DMA controller 58. The DMA controller 58 governs DMA transfer between the main memory 38 and the internal memory 52. Referring to FIG. 4, the internal memories 50 and 52 are shown as physically different members. Different memory areas within the same memory (device) may be used as the internal memories 50 and 52.

The internal memory 50 is connected to the DMA controller 56. The DMA controller 56 is connected to the bus 42. The internal memory 50 gets access to the main memory 38 via the bus 42 under control of the DMA controller 56. Then, data for a part of pixels (pixel data) constituting the uncorrected image data is transferred (DMA transferred) from the main memory 38 to the internal memory 50. Namely, the internal memory 50 is used for storing a part of the uncorrected image data transferred (inputted) from the main memory 38. The internal memory 50 corresponds to an internal uncorrected data storing component. The DMA controller 56 corresponds to an uncorrected data transferring component.

The internal memory 50 is formed of three line memories A to C. The three line memories A to C respectively store pixel data (a part of data of one line) corresponding to a predetermined number of pixels continued in a line direction (in an X direction). The line memories A to C store a part of data for different lines of the uncorrected image data.

The calculation processor 54 is connected to the internal memories 50 and 52. The calculation processor 54 is also connected to the bus 42. The calculation processor 54 reads out required pixel data from the internal memory 50. The calculation processor 54 generates, by calculation, data for a part of pixels (pixel data) constituting the image data with an optical distortion having been corrected (i.e., the corrected image data). The calculation processor 54 stores the data for a part of pixels (the pixel data) in the internal memory 52.

The internal memory 52 is connected to the DMA controller 58. The DMA controller 58 is connected to the bus 42. The internal memory 52 gets access to the main memory 38 via the bus 42 under control of the DMA controller 58. Then, a part of the corrected image data (the pixel data) is transferred (DMA transferred) from the internal memory 52 to the main memory 38. Namely, the internal memory 52 is used for storing the part of the corrected image data to be transferred (outputted) to the main memory 38. The internal memory 52 corresponds to an internal corrected data storing component. The DMA controller 58 corresponds to a corrected data transferring component.

The internal memory 52 is formed of two line memories M and N. The two line memories M and N respectively store pixel data (a part of data of one line) corresponding to a predetermined number of pixels continued in the line direction (in the X direction). The line memories M and N store a part of data for different lines of the corrected image data.

The calculation processor 54 outputs a control signal via the bus 42 to the DMA controllers 56 and 58. The calculation processor 54 governs the DMA transfer processing performed by the DMA controllers 56 and 58. Examples of the control signal include an access position designating signal for designating an address position in the main memory 38 to be accessed and the like and a transfer instructing signal for instructing reading/writing of data to/from the main memory 38.

The calculation processor 54 serves as governing the overall operation of the distortion corrector 24. In the distortion corrector 24, a processing is carried out as follows.

In the distortion corrector 24, a coordinate (x, Y) of a uncorrected image corresponding to a coordinate (x, y) of a corrected image is calculated. Pixel data for the uncorrected image in a vicinity of the calculated coordinate (X, Y) is read from the main memory 38. Pixel data P obtained by performing a calculation using the read pixel data is used as pixel data for the coordinate (x, y) of the corrected image. In this way, an optical distortion is corrected. The calculated pixel data P is successively written into the main memory 38 as the pixel data for the coordinate (x, y) of the corrected image. Finally, corrected image data is stored in the main memory 38.

As described above, according to the main memory 38, continuous access in a line direction (in the X direction) is fast but access to discontinuous addresses is slow. For this reason, data transfer (DMA transfer) at the time when the distortion corrector 24 reads the pixel data for the uncorrected image from the main memory 38 and writes the pixel data P for the corrected image into the main memory 38 is generally performed upon several pixel data units arranged in the line direction at a time in order to realize high speed processing.

An amount of distortion (displacement) for an optical distortion varies depending on a distance from the optical center. Namely, closer to the X axis, the smaller a displacement in a Y axis direction (i.e., an orthogonal direction orthogonal to the line direction) becomes. The further from the X axis, the larger the displacement in the Y axis direction becomes. Thus, even if correction is performed (the corrected image is generated) by any of the above-described correction pattern and the interpolation methods, in vicinities of the X axis, the number of lines for the uncorrected image required for correction is small in every portion on a line. When a line moves away from the X axis, the number of lines for the uncorrected image required for correction is increased and thus a large number of lines for the uncorrected image are required in order to generate a line for the corrected image. That is to say, an addressing for DMA transfer must be set for each line. As a result, control for DMA transfer becomes complicated.

Figure 5:
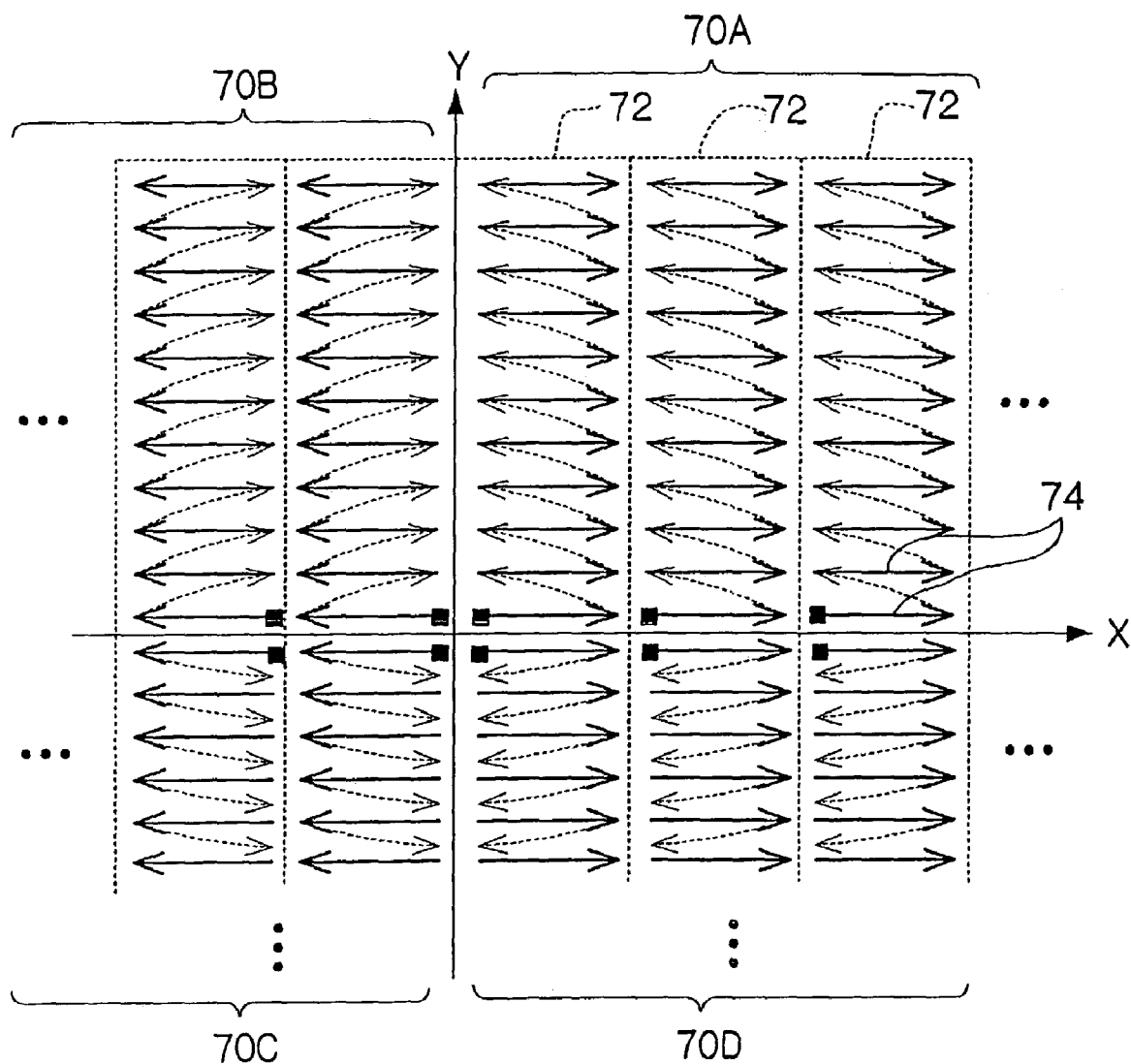
FIG. 5 is a conceptual diagram illustrating a method and an order for correcting an optical distortion relating to the first embodiment.

According to the distortion corrector 24 of this embodiment, as shown in FIG. 5, the corrected image data is divided into four quadrants 70A to 70D by the X and Y axes with a position corresponding to the optical center being the origin (base point). Further, each of the quadrants 70A to 70D is divided into a plurality of strip regions 72 so that the X axis direction width of each strip region has a predetermined number of pixels processed. For each of the strip regions 72, correction is performed for each line 74 within the strip region 72 (referred to as a "short line" in order to distinguish from a line in the overall image). The order of correction for short lines 74 within each of the strip regions 72 is such that, as shown by arrows in FIG. 5, the correction starts from short lines 74 near the X axis and is gradually moved away from the X axis.

The number of pixels processed corresponding to the width dimension of the strip region 72 (the short line 74) is set in advance to a value that regardless of the position of the corresponding short line 74, a line switching on the uncorrected image (i.e., a switching of line inputted to the distortion corrector 24) required for correction for the corresponding short line 74 occurs within one time. A number of pixels inputted that are DMA transferred from the main memory 38 and inputted to the distortion corrector 24 is also set in advance on a basis of the number of pixels processed.

As described above, an image is divided into four quadrants. Further, each of the quadrants is divided into strips. Then, a correction is successively performed for each of the strip regions 72 from the short line 74 which is closest to the X axis. Thus, in the DMA transfer from the main memory 38 to the internal memory 50, only the first address and the movement width to an address to be jumped to after one DMA transfer is performed may be designated. As a result, the DMA control processing may be simplified. Further, unlike prior arts, DMA transfer information, a correction coefficient and a coordinate of uncorrected data need not to be transferred. Consequently, the capacity of memory may be reduced.

For the corrected pixel data, when the data corresponding to one short line 74 is stored in the internal memory 52, the data is DMA transferred to the main memory 38 by the DMA controller 58. Thus, also in the DMA transfer from the internal memory 52 to the main memory 38, only a first address and a movement width to an address to be jumped to after one DMA transfer is performed may be designated. As a result, the DMA control processing may be simplified.

Next, the correction processing order will be described in detail for each of various types of optical distortions.

A spool type optical distortion has, as shown in FIG. 1C, an optical distortion curve which is always extended to the upper right (which always has positive differential values) with 0% (the optical center) being the origin. Then, in order to perform correction for a line, pixels on a uncorrected image at the peripheral side on a ray from the optical center are needed. Further, in the same line, pixels have different distances from the optical center. For this reason, as shown in FIG. 6, positions of pixels on the uncorrected image required to perform correction for one line draw a curve extending to the upper right.

Figure 6:
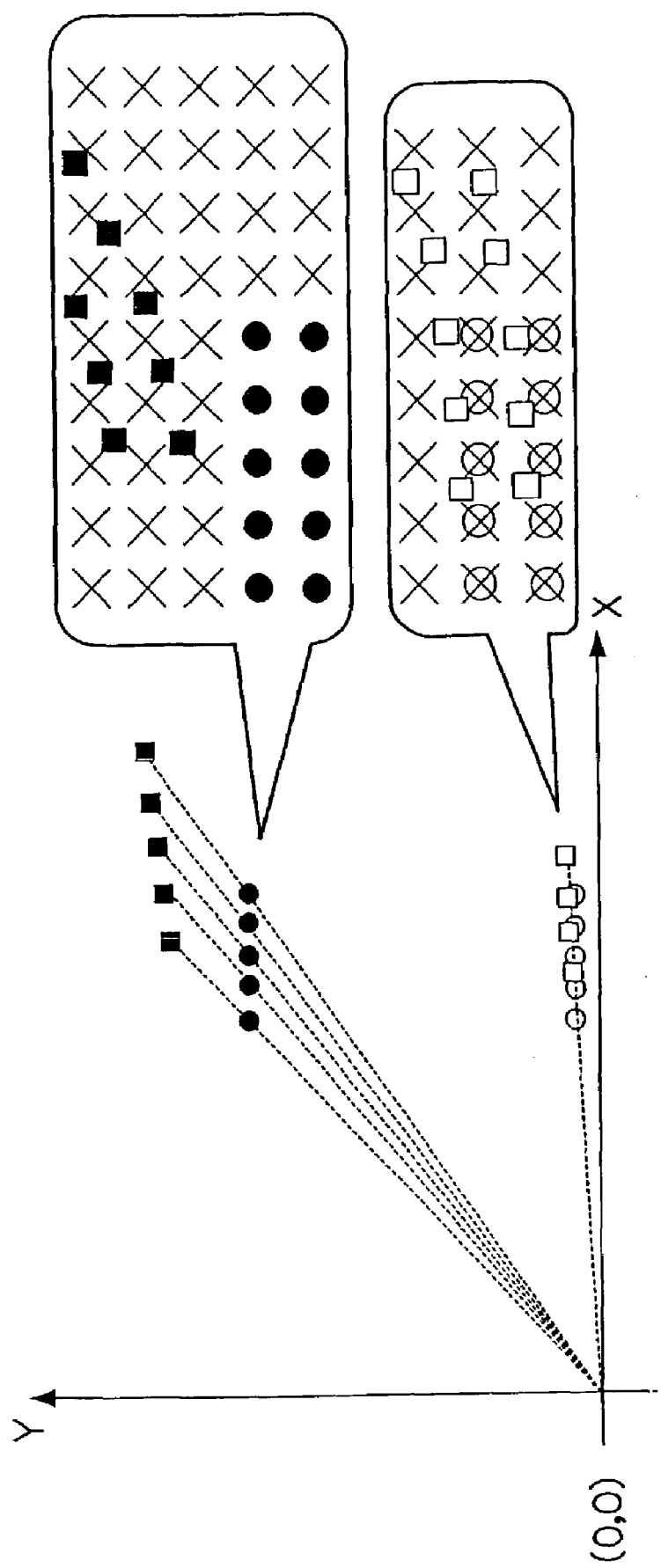
FIG. 6 is a conceptual diagram illustrating the correspondence relationship between positions of pixels on an image with its spool type optical distortion not having been corrected and those of pixels on an image with its spool type optical distortion having been corrected when a correction pattern 1 is used.

Referring to FIG. 6, when correction for a part of a line is performed by the correction pattern 1 in the case of the spool type optical distortion, a pixel to be generated by correction (i.e., a pixel of a corrected image) is indicated by a circle, a pixel of a uncorrected image is indicated by a cross and the position of the uncorrected image corresponding to the pixel of the corrected image indicated by a circle is indicated by a square. Further, referring to FIG. 6, the coordinate (0, 0) indicates the optical center of an image. Such indications will be applied to figures to be described later.

As seen from FIG. 6, on a line in a vicinity of the X axis, a displacement in the Y axis direction is small. For this reason, for every portion, the number of lines for the uncorrected image required for correction is small. On the other hand, when a line moves away from the X axis, the displacement in the Y axis direction becomes larger. Thus, the number of lines for the uncorrected image required for correction is also increased. According to the bi-linear interpolation, in order to perform correction for a pixel, pixels on different two lines for the uncorrected image data are needed. Then, according to this embodiment, the number of pixels processed is limited to numbers that enable interpolation within three input lines (twice for a set of two input lines) on every short line 74 regardless of the distance from the X axis. Specifically, on a short line 74 which is the furthest from the X axis, setting is performed so that the interpolation is possible within three input lines.

As seen from FIG. 6, when the spool type optical distortion is to be corrected by the correction pattern 1, in order to perform correction for a part of one line (e.g., a corresponding number of pixels is five), pixel data for the uncorrected image of pixels that are equal to or larger than the corresponding number of pixels (more than five pixels, e.g., ten pixels) in the peripheral direction (in the X axis direction) are at least needed. Namely, the number of pixels inputted is set to be larger than the number of pixels processed.

Further, as shown by the arrows in FIG. 5, in the case of the spool type optical distortion, a correction processing is performed within a short line 74 from a pixel closest to the optical center toward a pixel of the peripheral side.

This is because in the case of the spool type optical distortion, the positions of coordinates required for correction draw a curve extending toward the upper right within the same line, and the Y axis direction step width of the coordinate positions required for correction for adjacent short lines 74 within the same strip region 72 is larger than that of adjacent lines of the uncorrected image. Namely, the correction processing order within the short line 74 starts from a pixel which is closest to the optical center and then proceeds toward the peripheral direction. During the correction processing for the same short line 74, uncorrected image data of the next line may be required. On the other hand, the line data which is unnecessary during the correction processing for the same short line 74 is not required for the next short line 74.

Accordingly, the distortion corrector 24 switches an input line when the next line data is required during the correction for the same short line 74. Then, the required next line data is read out from the main memory 38 and DMA transferred, and thus overwritten on the unnecessary line data. As a result, the capacity of a memory for the distortion corrector 24 (a memory for the internal memory 50) for storing the pixel data of the uncorrected image read from the main memory 38 can be reduced.

For the correction processing order for the strip regions 72, in the case of the spool type optical distortion, it is preferable to perform the correction processing from the strip regions 72 at the image center side to peripheral strip regions 72.

Figure 7:
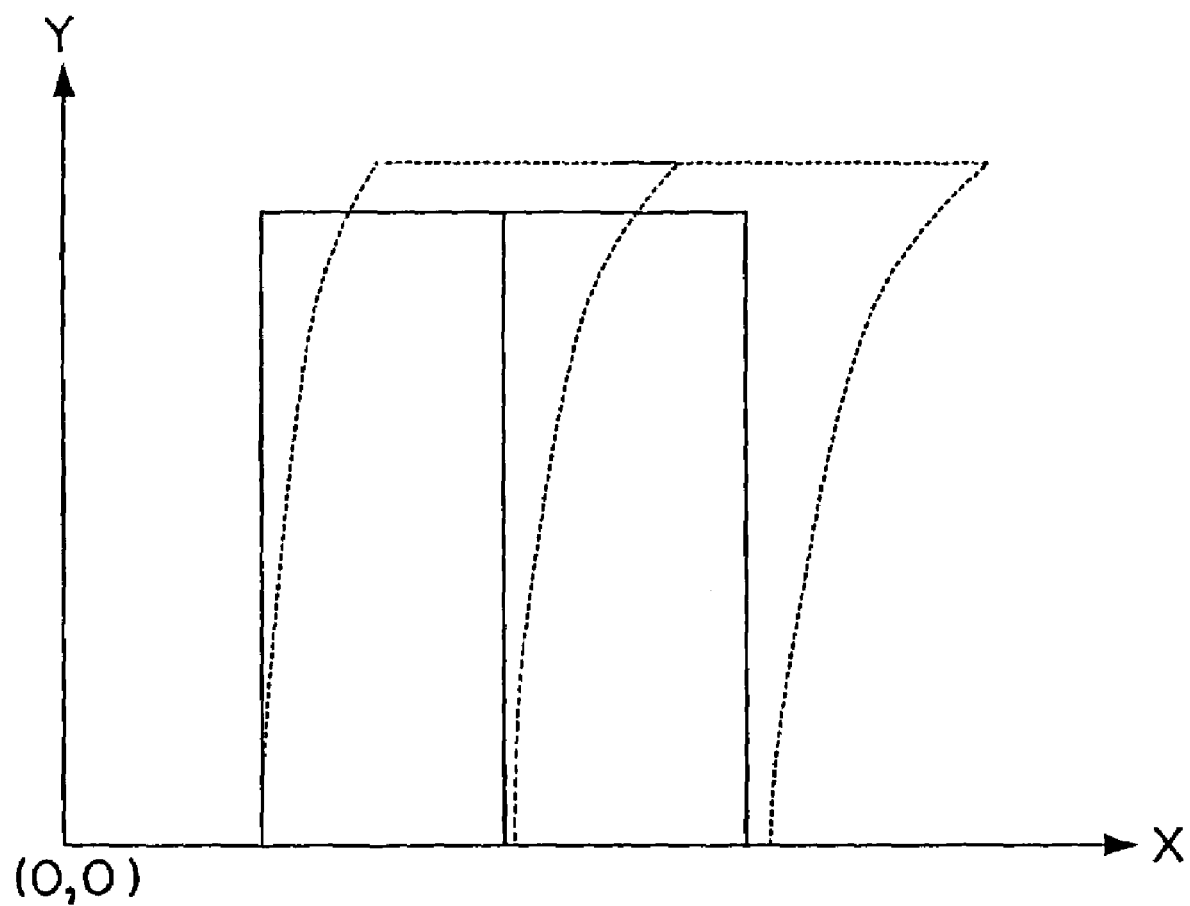
FIG. 7 is a conceptual diagram illustrating the positional relationship between a corrected strip region and a region of an uncorrected image required for correction for the corrected strip region when the spool type optical distortion is corrected for each strip region according to the first embodiment.

Referring to FIG. 7, strip regions 72 of a corrected image are by solid lines and uncorrected image areas required for the correction processing upon the strip regions 72 are shown by dot lines. Specifically, as shown in FIG. 7, the uncorrected image area required for the correction processing upon the strip region 72 is at the outer side from the center of the image with respect to the corresponding strip region 72 of the corrected image. Accordingly, the correction processing is performed from the strip region 72 at the image center side to the peripheral strip region 72. Then, the pixel data subjected to the correction by the distortion corrector 24 may be overwritten on DMA input original (uncorrected image data) in the main memory 38. Namely, the correction processing order for the strip regions 72 within each of the quadrants 70A to 70D starts from the strip region 72 at the image center side and then proceeds to the peripheral strip regions 72. As a result, the capacity of the main memory 38 can be reduced.

The correction processing order for the strip regions 72 within each of the quadrants 70A to 70D may start from the peripheral strip region 72 and then proceed to the strip region 72 at the image center side. In this case, however, the corrected pixel data cannot be overwritten on the DMA input original in the main memory 38.

Further, the correction processing order for the short lines 72 within the same strip region 72 may start from the short line 74 furthest from the X axis and then proceed in the direction approaching the X axis. Under such state, the correction processing order for the pixels within the short line 74 in the case of the spool type optical distortion starts from a peripheral pixel and then proceeds in the direction of approaching the optical center. Also in this case, the corrected pixel data cannot be overwritten on the DMA input original in the main memory 38.

Figure 8:
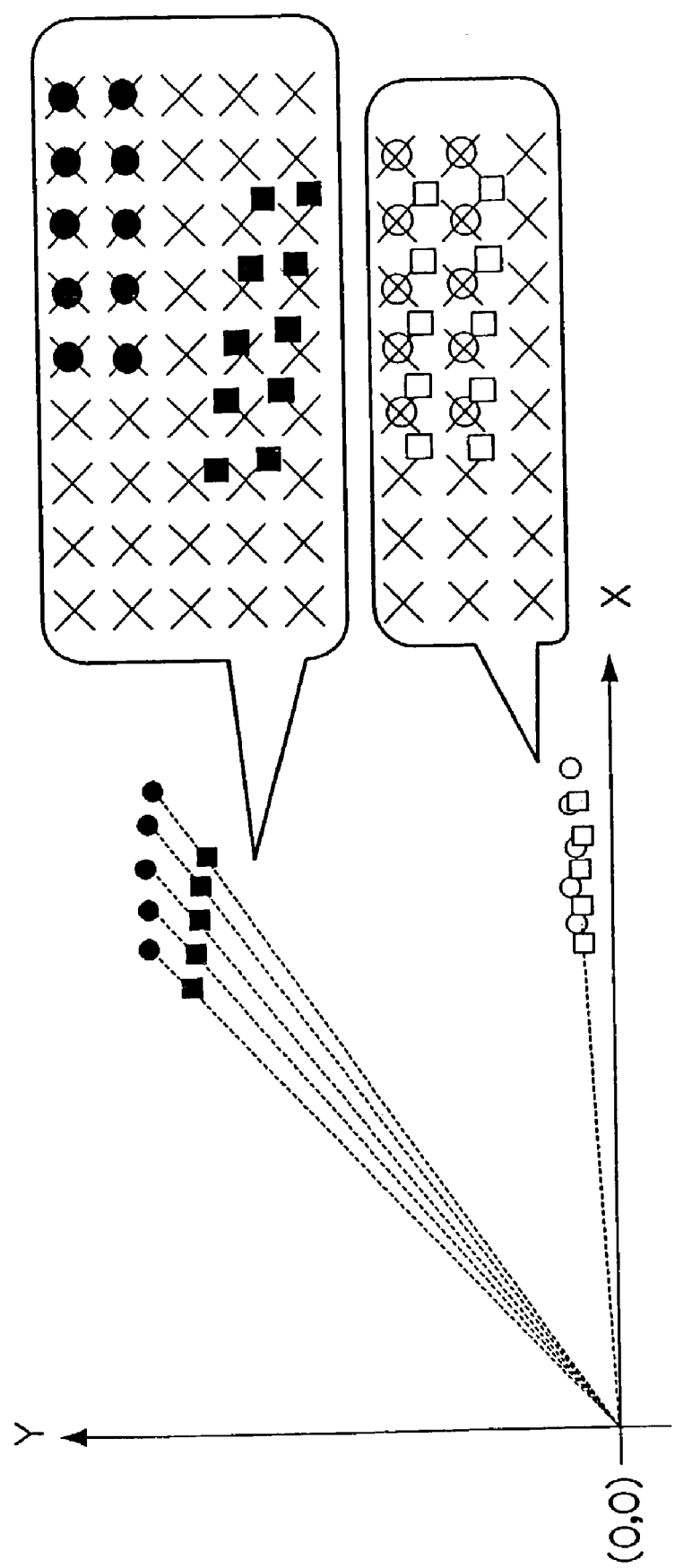
FIG. 8 is a conceptual diagram illustrating the correspondence relationship between positions of pixels on an image with its barrel type optical distortion not having been corrected and those of pixels on an image with its barrel type optical distortion having been corrected when the correction pattern 1 is used.

As shown in FIG. 1C, the barrel type optical distortion has an optical distortion curve which is always extended to the lower right (which has always negative differential values) with 0% (optical center) being the origin. As shown in FIG. 8, pixels of a uncorrected image required for correction are placed in the direction of the optical center with respect to pixels of a corrected image and the further from the optical center a pixel becomes, the larger its displacement is. For this reason, the positions of the coordinates for the uncorrected image corresponding to the pixels of the corrected image arranged in the line direction draw a curve extending to the lower right. In this case, excess pixels when the pixel data for the uncorrected image is transferred in order to perform correction for one short line 74 are selected in the optical center direction.

The correction processing order starts from a short line 74 furthest from the X axis. Further, within the short line 74, the correction processing is performed from a pixel closest to the optical center toward a pixel of the peripheral side. As a result, the capacity of a memory required for the distortion correction 24 can be reduced.

The correction processing order for the strip regions 72 within each of the quadrants 70A to 70D starts from the peripheral strip region 72 and then proceed to the strip region 72 at the image center side. The corrected pixel data can be overwritten on DMA input original (uncorrected image data) in the main memory 38. As a result, the capacity of the memory for the main memory 38 can be reduced.

Correction may be performed from the strip region 72 at the image center side to the peripheral strip region 72. Nevertheless, in this case, the corrected pixel data cannot be overwritten on the DMA input original.

The correction processing order within the strip region 72 may start from the short line 74 which is closest to the X axis and then proceed in the direction away from the X axis. In this case, the correction processing order for pixels within the short line 74 may start from a pixel which is furthest from the optical center and then proceed in the direction of approaching the optical center. Also in this case, the corrected pixel data cannot be overwritten on the DMA input original in the main memory 38.

<Operation>

Operations of this embodiment will be described.

According to the digital camera 10 relating to this embodiment, the CCD 14 photographs a subject on a basis of entering light which has transmitted through lenses of the optical unit 12 and indicates a subject image. Then, an analog image signal indicating the subject image is obtained. The analog image signal is converted into a digital image signal in the A/D converter 16. Further, the digital image signal is converted into a YC signal in the signal processing processor 22 and the resultant YC signal is temporarily stored in the main memory 38 as uncorrected image data.

The distortion corrector 24 reads out the uncorrected image from the main memory 38 and corrects its optical distortion. Then, corrected image data is stored again in the main memory 38 (details thereof will be described later). The corrected image data is displayed onto the LCD 18 through the LCD controller 26 or recorded in the external recording media 28 through the media controller 30. When displaying on the LCD 18, the uncorrected image data may be used and a photographed subject image may be immediately displayed thereon.

(Optical Distortion Correction Processing)

Figure 9A:
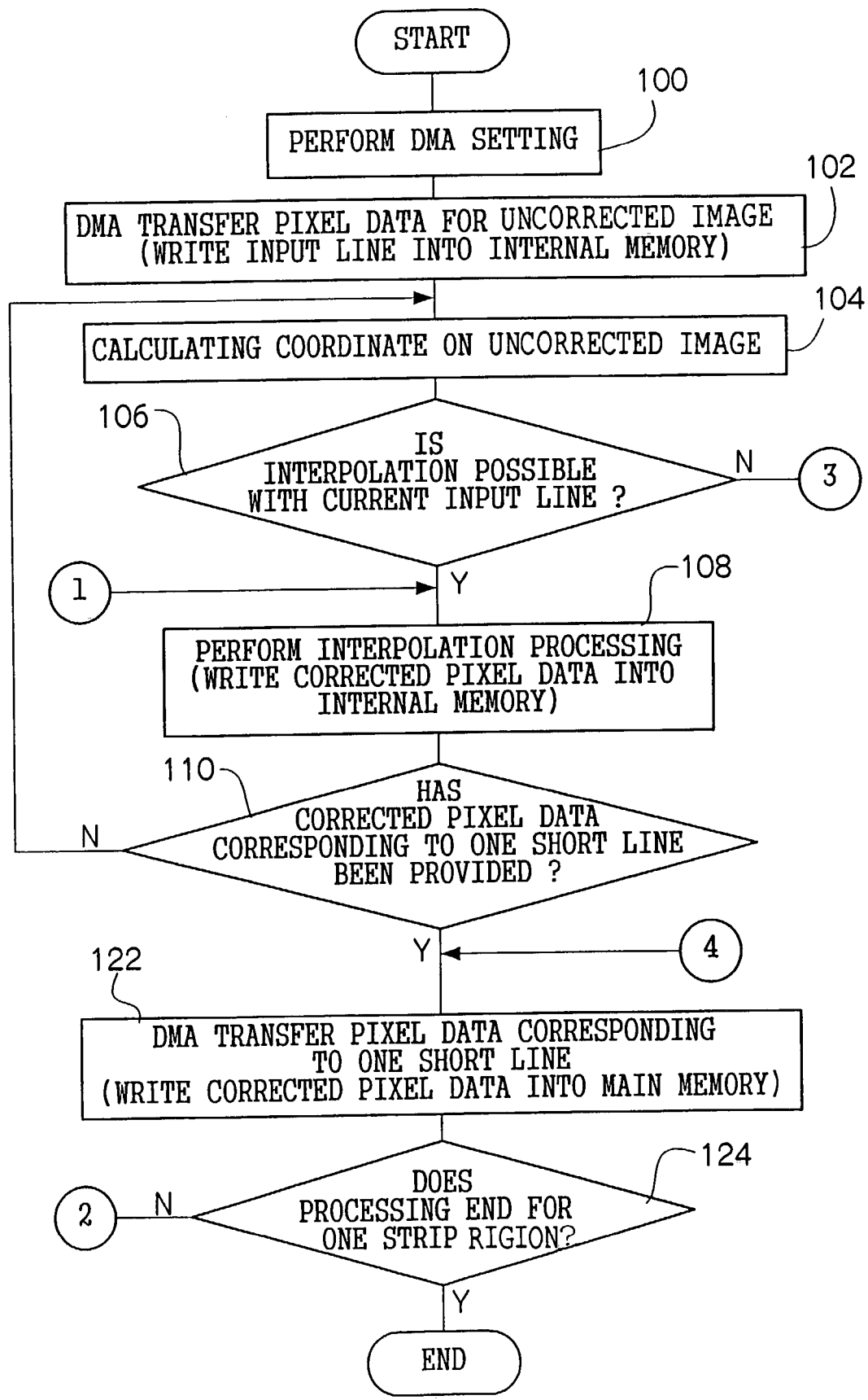
FIGS. 9A, 9B and 9C are flowcharts of a control processing that is performed by a calculation processor of the first embodiment for each of strip regions.
Figure 9B:
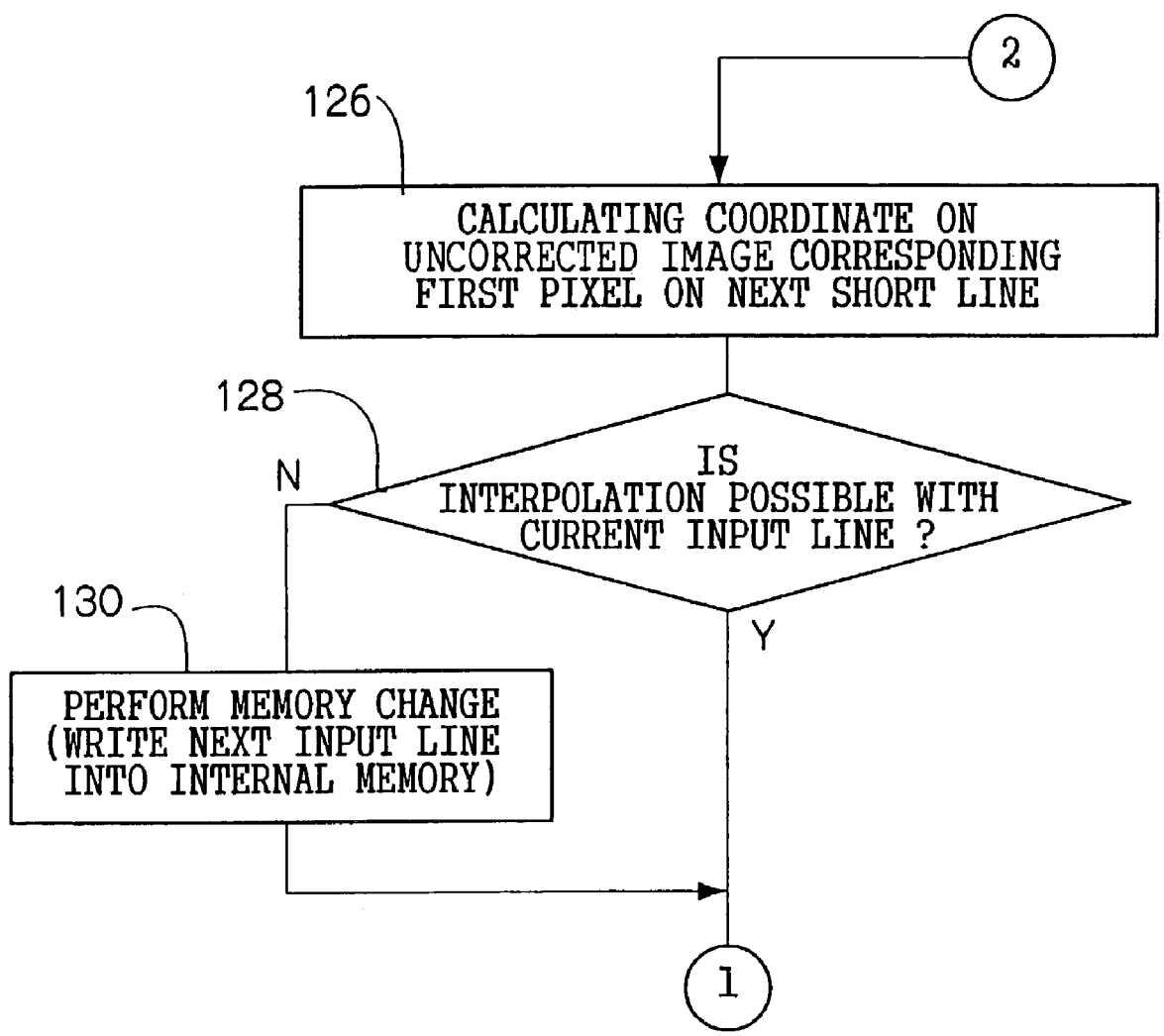
Figure 9C:
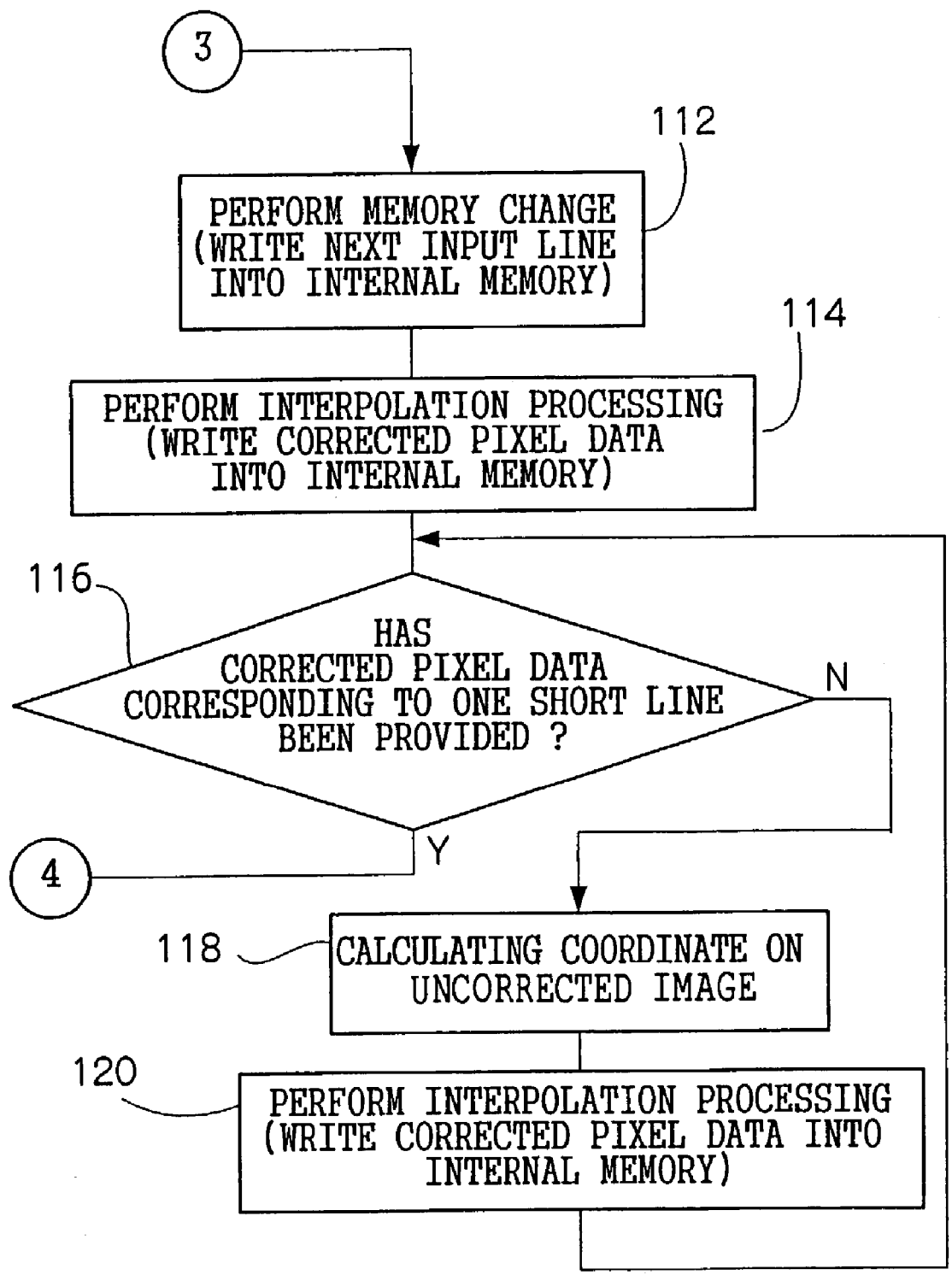

The processing for correcting an optical distortion performed by the calculation processor 54 will be described with reference to FIGS. 9A, 9B and 9C. FIGS. 9A, 9B and 9C illustrate the optical distortion correction processing performed by the calculation processor 54 for each of the strip regions 72.

As shown in FIGS. 9A, 9B and 9C, firstly in step 100, the calculation processor 54 performs a setting for performing a DMA transfer in the DMA controllers 56 and 58, i.e., sets an address position of the main memory 38 to be accessed depending on the strip region 72 for correction.

Specifically, the calculation processor 54 sends a signal indicating the first address that pixel data for a uncorrected image required for correction for a short line 74 firstly subjected to the correction processing in the corresponding strip region 72 is stored and the movement width to an address to be jumped to after the processing for the short line 74 to the DMA controller 56 as an access position designating signal. The calculation processor 54 sends a signal indicating the first address that the pixel data of the firstly processed short line 74 is stored and the movement width of an address to be jumped to after the short line 74 is stored to the DMA controller 58 as an access position designating signal. The processing order is set in advance as the above description of the optical distortion correction processing.

In next step 102, DMA transfer is instructed to the DMA controller 56. When receiving this instruction, the DMA controller 56 gets an access to the address position of the main memory 38 set in step 100. Then, the pixel data for the uncorrected image corresponding to the number of pixels inputted that is set in advance and counted from the address position (one input line) is read from the main memory 38 and written into the internal memory 50 (DMA transfer). When the DMA transfer for one input line is completed, the access position of the main memory 38 is jumped by the address movement width set in step 100, and then next input line is DMA transferred. Such operations are repeated and thus the storable number of input lines (input lines corresponding to the number of line memories included in the internal memory 50) are written into the internal memory 50.

Input lines that are DMA transferred and written in the internal memory 50 as described above are referred to as a first input line, a second input line . . . according to the order of DMA transfer. According to the bi-linear interpolation, data of two input lines is used to perform the interpolation processing upon one pixel. For this reason, in the calculation processor 54, the first and second input lines are used as data to be used for the correction processing upon the first short line 74. According to the nearest neighbor interpolation, data of one input line is used to perform the interpolation processing upon one pixel. For this reason, the first input line is used as data to be used for the correction processing upon the first short line 74.

In next step 104, when at least the number of input lines required for the interpolation processing are written into the internal memory 50, a correction for the first short line 74 starts according to the correction order within the strip region 72. Further, the coordinate (x, Y) on the uncorrected image corresponding to the corrected pixel (x, y) is calculated by the above-described expression (2) according to the correction order within the corresponding short line 74.

In next step 106, whether or not the pixel data at the calculated coordinate (X, Y) can be interpolated by the pixel data of input line currently serving as the data used for the correction processing is determined.

If the pixel data can be interpolated, the process proceeds from step 106 to step 108. In step 108, the interpolation processing is performed according to an interpolation method such as the nearest neighbor interpolation or the bi-linear interpolation. Namely, pixel data in a vicinity of the coordinate (X, Y) is read from the internal memory 50. Pixel data P at the coordinate (X, Y) is calculated from the read pixel data. Then, the result of calculation is written into the internal memory 52 as pixel data at the coordinate (x, y) of the corrected image. In this way, correction for a pixel at the coordinate (x, y) of the corrected image is performed.

The answer to the determination in step 110 is negative and the process returns to step 104 until corrected pixel data for one short line 74 is provided. According to the correction order within the short line 74, a coordinate of the uncorrected image corresponding to the next pixel is calculated. The same processings are repeated. If the pixel data P for the calculated coordinate (X, Y) cannot be interpolated by the pixel data for input line currently serving as the data used for the correction processing, the process proceeds from step 106 to step 112. Then, an input line used for the correction processing is switched (memory change).

According to this embodiment, when a memory is changed, the DMA controller 56 is instructed to DMA transfer the next input line. When receiving this instruction, the DMA controller 56 jumps to an access position of the main memory 38 by the address movement width set in step 100. The next input line is DMA transferred and overwritten on the data of the oldest input line.

When an input line used for the correction processing is switched, the process proceeds to step 114. In step 114, the same interpolation processing as in step 108 is performed. The corrected pixel data is written into the internal memory 52.

As described above, the number of pixels processed within a short line 74 is determined so that an input line is switched within once. Thus, the correction processing upon remaining pixels within the corresponding short line 74 can be certainly performed by the input line switched in step 112.

Then, the answer to the determination in step 116 is negative until the pixel data for one short line 74 is provided. The process proceeds to step 118. In step 118, according to the correction order within the short line 74, the coordinate (X, Y) at the uncorrected image corresponding to the next pixel (x, y) is calculated. In step 120, the same interpolation processing as in step 108 is performed and the corrected pixel data is written into the internal memory 52.

When the corrected pixel data for one short line 74 is written into the internal memory 52, the answer to the determination in step 110 or 116 is affirmed. Then, the process proceeds to step 122. In step 122, the DMA controller 58 is instructed to DMA transfer the corrected pixel data for the corresponding short line 74. When receiving this instruction, the DMA controller 58 reads the corrected pixel data for the short line 74 stored in the internal memory 52. The DMA controller 58 gets an access to the address position of the main memory 38 set in step 100 and write the corrected pixel data for the short line 74 from the access position. In the case of the second access to the main memory 38 and subsequent accesses thereto, the DMA controller 58 jumps from the last access position of the main memory 38 by the address movement width set in step 100 and then writes the corrected pixel data for the short line 74.

In step 124, whether or not the processing is completed for all short lines 74 within a strip region 72 is determined. If there remains short lines 74 unprocessed, the process proceeds to step 126 in order to perform the correction processing for the next short line 74. According to the correction order within the corresponding short line 74, the coordinate (X, Y) of the uncorrected image corresponding to the corrected pixel (x, y) is calculated by the expression (2). If the pixel data for the calculated coordinate (X, Y) can be interpolated by the pixel data for input line currently serving as the data used for the correction processing, the process returns from step 128 to step 108. On the other hand, if the pixel data for the calculated coordinate (X, Y) cannot be interpolated by the pixel data for input line currently serving as the data used for the correction processing, the process proceeds from step 128 to step 130. Then, an input line used for the correction processing is switched (memory change). The process returns to step 108 and the processing is performed for the next short line 74 in the same manner as the above-described one.

When the processing is completed for all short lines 74 within the strip region 72, the answer to the determination in step 124 is affirmed. In this way, the correction processing for the corresponding strip region 72 is completed.

FIG. 10 shows the operations of the respective sections in the distortion corrector 24 when the above-described optical distortion correction processing is performed. Here, FIG. 10 shows the operations after settings for the DMA transfer are performed for the DMA controllers 56 and 58 by the calculation processor 54.

As shown in FIG. 10, the DMA controller 56 firstly reads a part of the uncorrected image data corresponding to the predetermined number of pixels on the main memory 38 with continuous addresses (one input line), DMA transfers the data to the line memory A and writes the same therein (time interval T10).

When the transfer to the line memory A ends, the DMA controller 56 DMA transfers the next input line to the line memory B and writes the same therein (time interval T11). When this transfer ends, the DMA controller 56 DMA transfers the next input line to the line memory C and writes the same therein (time interval T12). As a result, the input line data is written into the line memories A to C. The line numbers for the input line data in the line memories A to C are increased by one in this order.

According to the bi-linear interpolation, when the pixel data for two input lines is provided, the interpolation processing is possible upon a pixel. Then, in the distortion corrector 24, when the pixel data for the first two input lines is accumulated in the line memories, the calculation processor 54 starts a correction calculation processing for optical distortion upon the first short line 74 (time interval T13). Here, the correction calculation processing herein refers to as a calculation for a coordinate of a uncorrected image and an interpolation processing.

As described in the principal for correcting an optical distortion, the calculation processor 54 calculates the coordinate of the uncorrected image corresponding to the coordinate of the image to be produced (i.e., the corrected image). Further, coordinates of four pixels around the calculated coordinate are calculated and four addresses in line memories corresponding to the coordinates of the four pixels are calculated. Specifically, assume that the coordinates of the four pixels are indicated by (X, Y), (X, Y+1), (X+1, Y) and (X+1, Y+1), respectively. The X coordinates are converted into addresses within the respective line memories and the Y coordinates are converted into the line number, i.e., information for designating the line memory. When correction for the first short line 74 is performed, a set of the line memories A and B is designated, from the smaller line number, as line memories at the reading end. The pixel data stored in the calculated address is read out from the line memories A and B. Then, the pixel data P is calculated by the expression (3) and the result of calculation is written into the line memory M.

The pixel data P calculated by the expression (3) is written into the line memory M by the predetermined number of pixels processed, it is considered that correction for the first short line 74 is completed. Then, the DMA controller 58 reads the pixel data in the line memory M and DMA transfers the same to the main memory 38 (time interval T14). Further, the DMA controller 56 newly DMA transfers the next input line from the main memory 38 to the line memory A and overwrites the line (time interval T15).

During the above-described operation, the calculation processor 54 continues to perform the correction calculation processing. When the data written in the line memory C reaches the predetermined number of pixels (one input line), the line memories at the reading end is switched to a set of line memories B and C so that the line numbers of the line memories are increased by one, respectively (memory change). Further, a line memory at the writing end is switched to another one (a line memory N). Then, correction for the second short line 74 is performed in the same manner (time interval T16a).

When the address corresponding to the calculated coordinate does not exist in the set of line memories (line memories B and C in this example) that is being accessed as the reading end, the calculation processor 54 switches the line memory to be accessed as the reading end from the line memory that is being accessed corresponding to the older line number (the line memory B) to another line memory not to be accessed (line memory A) (memory change).

The calculation processor 54 waits until this memory change ends (time interval T16b). When the memory change ends, the data stored in the address corresponding to the coordinate calculated by the expression (2) is read out from new set of line memories (i.e., line memories C and A). Then, the calculation processing is performed by the expression (3) and the pixel data P obtained by this calculation is written into the same line memory (i.e., the line memory N) (time interval T16c). Namely, correction for the second short line 74 is performed during the time interval T16(=T16a+T16b+T16c).

At the same time of the memory change, the next input line is newly DMA transferred by the DMA controller 56 from the main memory 38 and overwritten on the line memory that not is not accessed because of the memory change (i.e., the line memory B) (time interval T17).

When the pixel data P corresponding to the predetermined number of pixels processed is written into the line memory N, the correction for the second short line 74 is considered to be completed. The DMA controller 58 reads the pixel data in the line memory N and DMA transfers the data to the main memory 38 (time interval T18). Similarly, the correction calculation processing for a third short line 74 starts. The same processings as the above-described processings are repeated for the third short line 74, a fourth short line 74 . . . . In this way, correction for the strip region 72 is performed. Such processings are performed for all strip regions 72 and thus the corrected image data with its optical distortion having been corrected is stored in the main memory 38.

In the distortion corrector 24, the DMA transfer for input/output is performed by double-buffer in order to increase a speed. Alternatively, the line memories C and N may be omitted and the DMA transfer may be performed by a single buffer as shown in FIG. 11.

Figure 11:
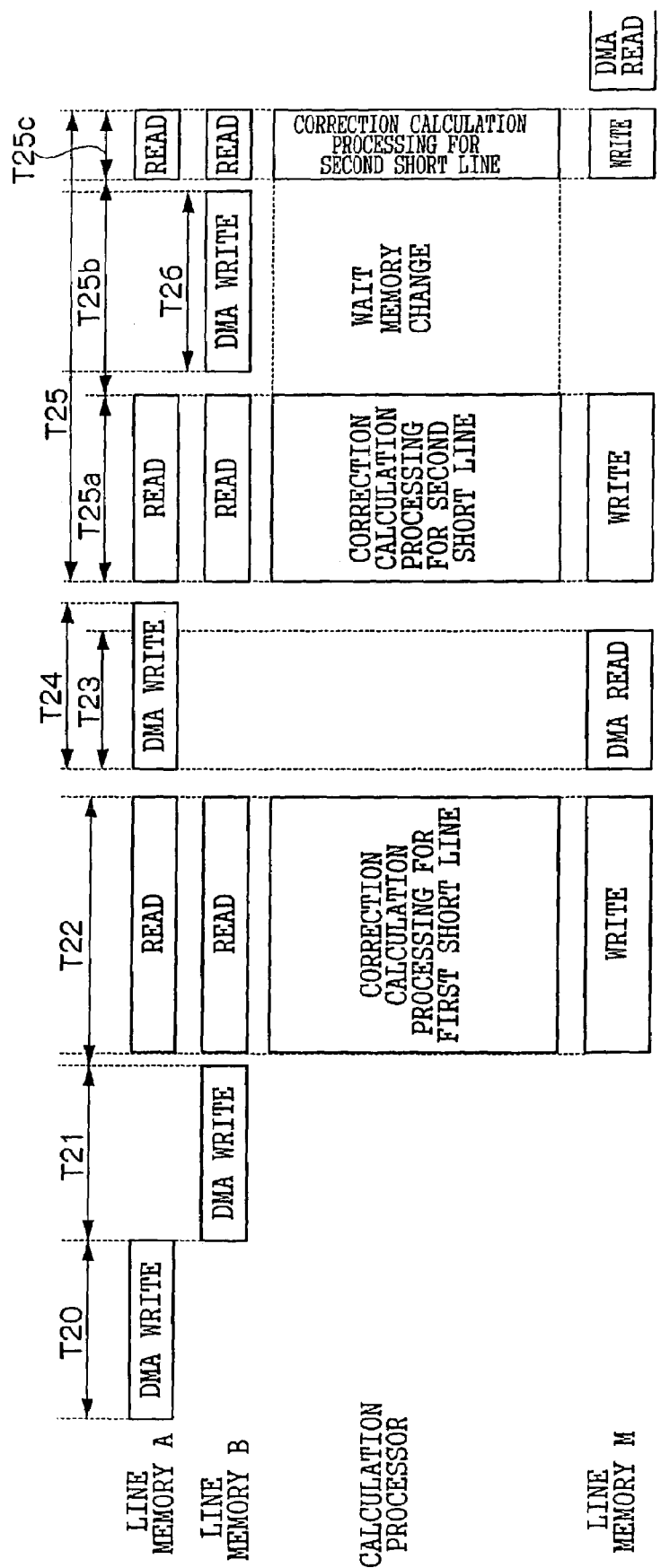
FIG. 11 is a timing chart illustrating the operations of the respective sections of the distortion corrector relating to a modified example of the first embodiment (in the case of single buffer).

As shown in FIG. 11, the DMA controller 56 firstly reads a part of the uncorrected image data corresponding to the predetermined number of pixels on the main memory 38 with continuous addresses (one input line), DMA transfers the data to the line memory A and writes the data therein (time interval T20).

When a transfer to the line memory A ends, the DMA controller 56 DMA transfers the next input line to the line memory B and writes the same therein (time interval T21). As a result, the line data with their line numbers being different by one with each other are written into the line memories A and B, respectively.

When the pixel data corresponding to two input lines is accumulated in the line memories, the calculation processor 54 starts the correction calculation processing for an optical distortion upon the first short line 74. As in the case of the above-described double-buffer, the result of calculation is written into the line memory M (time interval T22).

When the pixel data P corresponding to the predetermined number of pixels processed is written into the line memory M, the correction for the first short line 74 is considered to be completed. Then, the DMA controller 58 reads the pixel data in the line memory M and DMA transfers the same to the main memory 38 (time interval T23). Further, the DMA controller 56 newly DMA transfers the next input line from the main memory 38 to the line memory A and overwrites the line (memory change, time interval T24).

When DMA transfer to the line memory A ends, the calculation processor 54 starts the correction calculation processing for an optical distortion upon the second short line 74. The result of calculation is written into the line memory M (time interval T25a).

The memory change during the correction calculation processing is appropriately performed as in the case of double-buffer (time interval T26). The calculation processor 54 waits until the memory change ends (time interval T25b). When the memory change ends, the calculation processor 54 continues the correction calculation processing. The result of calculation is written into the line memory M (time interval T25c). Namely, correction for the second short line 74 is performed during the time interval T25(=T25a+T25b+T25c).

When the pixel data P corresponding to the predetermined number of pixels processed is written into the line memory M, it is considered that correction for the second short line 74 is completed. Then, the DMA controller 58 reads out the pixel data in the line memory M and the read pixel data is DMA transferred to the main memory 38. Similarly, the correction calculation processing upon a third short line 74 starts. The same processings as the above-described processings are repeated for the third short line 74, a fourth short line 74 . . . and thus correction for one strip region 72 is performed. Such processings are performed for all strip regions 72 and thus the corrected image data with its optical distortion having been corrected is stored in the main memory 38.

As in the case of the double-buffer, the image data with its optical distortion having been corrected can be obtained in the case of the single buffer. In the case of the single buffer, as compared to the case of the double-buffer, the number of line memories for the internal memory, i.e., the capacity of memory can be reduced but a processing speed becomes slow.

SECOND EMBODIMENT

Figure 12:
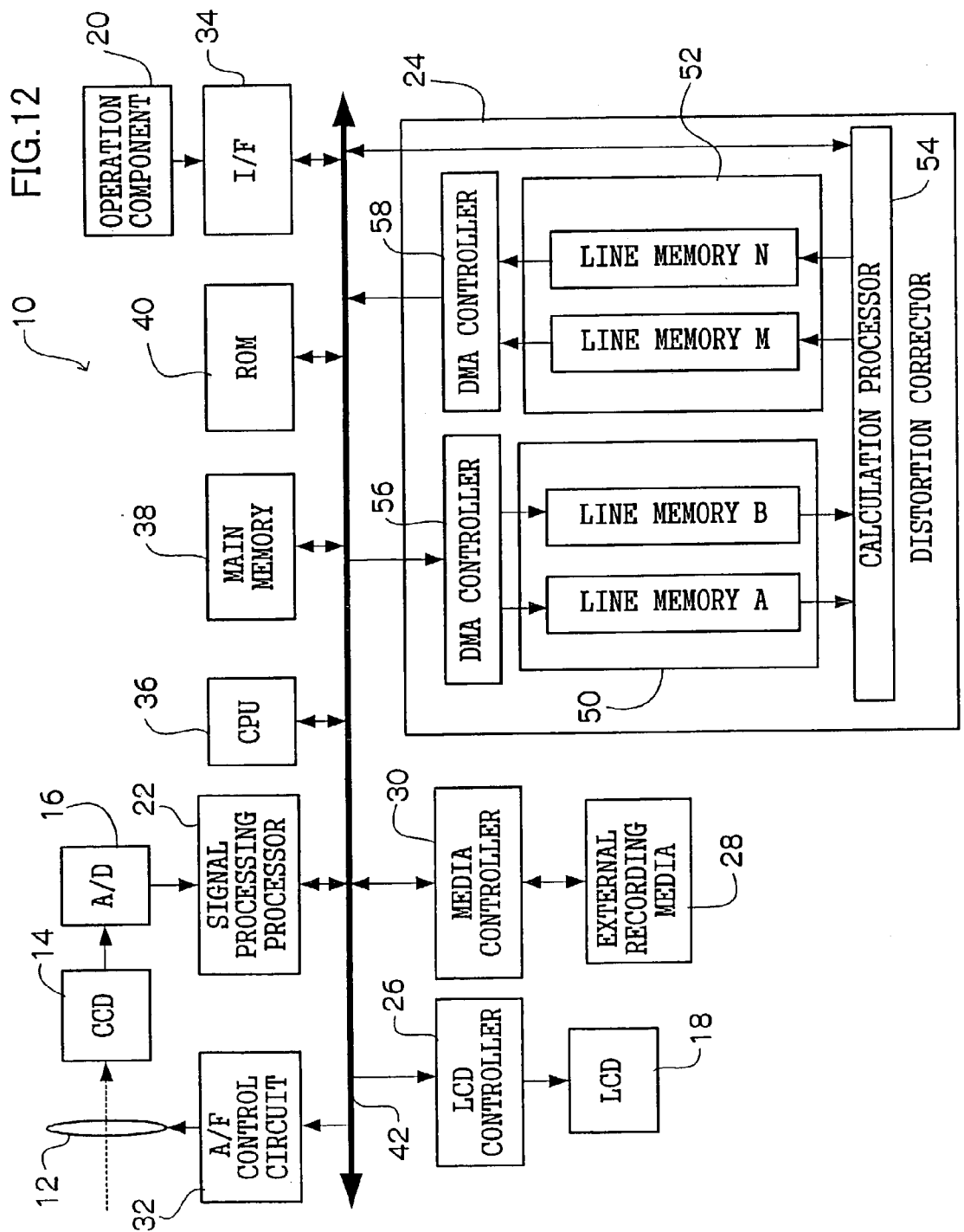
FIG. 12 is a block diagram illustrating the structure of a digital camera relating to a second embodiment.

According to a second embodiment, the case of correcting an optical distortion by using the nearest neighbor interpolation as an interpolation method according to the correction pattern 1 will be described. FIG. 12 shows the detailed structure of the distortion corrector 24 under such case. Referring to FIG. 12, the same reference numerals are attached to the same members as those of the first embodiment. Only the portion that differs from the first embodiment will be described in detail.

As shown in FIG. 12, the internal memory 50 for the distortion corrector 24 is formed of two line memories A and B. The internal memory 52 for the distortion corrector 24 is formed of two line memories M and N.

As in the first embodiment, the DMA controller 56 DMA transfers the pixel data for the uncorrected image from the main memory 38. Input lines with their Y direction coordinates (line numbers) being different by one with each other are written (stored) into the line memories A and B so that the line memory is switched for each of the input lines.

The calculation processor 54 calculates the corrected pixel data by the nearest neighbor interpolation while using the data stored in the line memories A and B as the uncorrected image data.

The DMA controller 58 DMA transfers the pixel data stored in the line memory M or N to the main memory 38 and writes the same therein, as in the first embodiment.

According to the nearest neighbor interpolation, only one pixel on one line for the uncorrected image data that is necessary for correction for one pixel. For this reason, according to this embodiment, the number of pixels processed is restricted so that an interpolation is possible within two input lines (twice for a input line) on every short line 74 regardless of the distance from the X axis. Specifically, on a short line 74 which is the furthest from the X axis, setting is performed so that the interpolation is possible within two input lines. The number of pixels inputted is set depending on the number of pixels processed. The correction processing order is the same as in the first embodiment (see FIG. 5).

Figure 13:
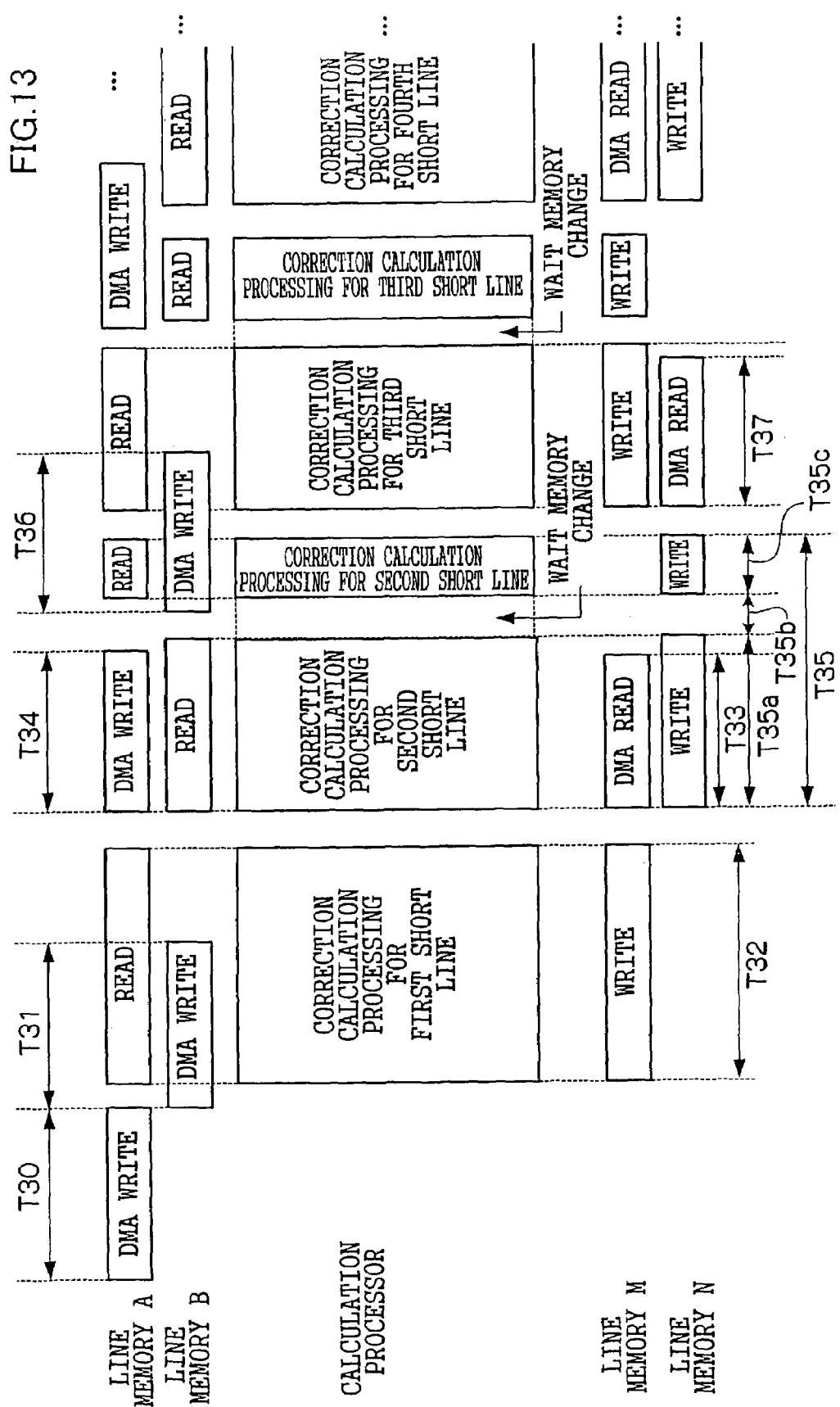
FIG. 13 is a timing chart illustrating the operations of respective sections of a distortion corrector of the second embodiment.

Next, the operations of the distortion corrector 24 with the above-described structure will be described. The processing of the calculation processor 54 is basically the same as in FIG. 9 except that the interpolation method is changed. Here, the operations of the respective sections in the distortion correction 24 will be described with reference to FIG. 13. FIG. 13 illustrates the operations after the calculation processor 54 performs settings for DMA transfer upon the DMA controllers 56 and 58.

As shown in FIG. 13, the DMA controller 56 firstly reads out a part of the uncorrected image data corresponding to the predetermined number of pixels from the main memory 38 with continuous addresses (one input line), DMA transfers the read out data to the line memory A and writes the same therein (time interval T30).

When the transfer to the line memory A ends, the DMA controller 56 DMA transfers the next input line to the line memory B and writes the same therein (time interval T31). The line data with their line numbers being different by one with each other is written into the line memories A and B, respectively.

According to the nearest neighbor interpolation, the interpolation processing for one pixel is possible by the pixel data corresponding to one input line. For this reason, in the distortion corrector 24, when the pixel data for the first one input line is accumulated in the line memory, the calculation processor 54 starts the correction calculation processing for an optical distortion upon the first short line 74 (time interval T32).

At the calculation processor 54, the coordinate of the uncorrected image corresponding to the coordinate of the image to be generated (i.e., the corrected image) is calculated by the expression (2). Further, the coordinate of a pixel which is the nearest to the calculated coordinate is calculated. The address of the line memory corresponding to the coordinate of the nearest pixel is calculated. In the correction calculation processing for the first short line 74, the line memory A with the smaller line number is designated as a line memory at the reading end. The pixel data that is stored in the calculated corresponding address is read from the line memory A and written into the line memory M as the pixel data P.

When the pixel data P is written into the line memory M by the predetermined number of pixels processed, it is considered that correction for the first short line 74 is completed. Then, the DMA controller 58 reads the pixel data in the line memory M and DMA transfers the same to the main memory 38 (time interval T33). The DMA controller

56 newly DMA transfers the next input line from the main memory 38 to the line memory A (time interval T34).

The calculation processor 54 continues the correction calculation processing during the above-described operation. When the data written into the line memory A reaches the predetermined number of pixels (one input line), the line memory at the reading end is switched to the line memory B so that the line number is increased by one (memory change). A line memory at the writing end is also switched to another line memory (i.e., the line memory N). Then, the correction calculation processing is performed for a second short line 74 (time interval T35a).

When the address corresponding to the calculated coordinate does not exist in the line memory which is being accessed at the reading end (i.e., in the line memory B), the calculation processor 54 switches the line memory to be accessed as the reading end to another line memory which is not accessed (i.e., the line memory A) (memory change).

The calculation processor 54 waits until this memory change ends (time interval T35b). When the memory change ends, data which is stored in the address corresponding to the calculated coordinate is read from the new line memory (i.e., the line memory A) and used as the pixel data P. The pixel data P is written into the same line memory (i.e., the line memory N) (time interval T35c). Namely, the correction for the second short line 74 is performed during the time interval T35(=T35a+T35b+T35c).

At the same time of the memory change, DMA controller 56 newly DMA transfers the next input line from the main memory 38 to the line memory which now is not accessed because of the memory change (i.e., line memory B) and overwrites the same therein (time interval T36).

When the pixel data P is written into the line memory N by the predetermined number of pixels processed, it is considered that correction for the second short line 74 is completed. Then, the DMA controller 58 reads the pixel data in the line memory N and DMA transfers the same to the main memory 38 (time interval T37). The correction calculation processing starts upon a third short line 74 in the same manner. The same processings as the above-described processings are repeated for the third short line 74, a fourth short line 74 . . . and thus correction for one strip region 72 is performed. Such processings are performed for all strip regions 72 and thus the corrected image data with its optical distortion having been corrected is stored in the main memory 38.

In the distortion corrector 24, the speed of the DMA transfer for input/output is increased by using a double-buffer. The line memories B and N may be omitted and DMA transfer may be performed by a single buffer as shown in FIG. 14.

Figure 14:
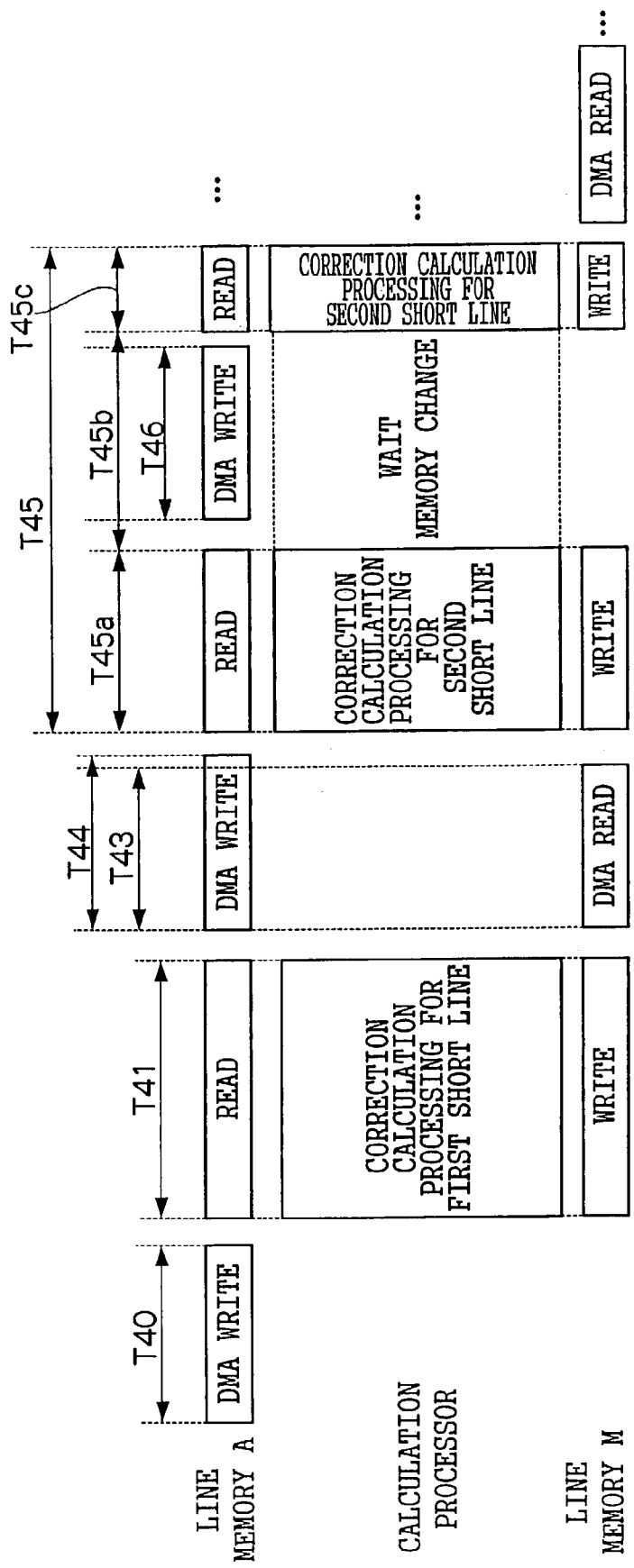
FIG. 14 is a timing chart illustrating the operations of the respective sections of the distortion corrector relating to a modified example of the second embodiment (in the case of single buffer).

Referring to FIG. 14, the DMA controller 56 firstly reads a part of the uncorrected image data corresponding to the predetermined number of pixels with continuous addresses (one input line) from the main memory 38, DMA transfers the data to the line memory A and writes the same therein (time interval T40).

When the data has been transferred to the line memory A, the calculation processor 54 starts the correction calculation processing for an optical distortion upon a first short line 74. As in the above-described case of the double-buffer, the result of calculation is written into the line memory M (time interval T41).

When the pixel data P is written into the line memory M by the predetermined number of pixels processed, it is considered that correction for the first short line 74 is completed. Then, the DMA controller 58 reads the pixel data in the line memory M and DMA transfers the same to the main memory (time interval T43). The DMA controller 56 newly DMA transfers the next input line from the main memory 38 to the line memory A and overwrites the line thereon (memory change, time interval T44).

When the DMA transfer to the line memory A ends, the calculation processor 54 starts the correction calculation processing for an optical distortion upon a second short line 74. The result of calculation is similarly written into the line memory M (time interval T45a).

The memory change during the correction calculation processing is appropriately performed as in the case of double-buffer (time interval T46). The calculation processor 54 waits until the memory change ends (time interval T45b). When the memory change ends, the calculation processor 54 continues the correction calculation processing and writes the result of calculation into the line memory M (time interval T45c). Namely, correction for the second short line 74 is performed during the time interval T45(=T45a+T45b+T45c).

Then, when the pixel data P is written into the line memory M by the predetermined number of pixels processed, it is considered that correction for the second short line 74 is completed. The DMA controller 58 reads the pixel data in the line memory M and DMA transfers the same to the main memory 38. Then, the correction calculation processing starts for a third short line 74 in the same manner as that of the above-described. The same processings as the above-described processings are repeated for the third short line 74, a fourth short line 74 . . . and thus correction for one strip region 72 is performed. Such processings are performed upon all strip regions 72 and thus the corrected image data with its optical distortion having been corrected is stored in the main memory 38.

As described above, even a single buffer can obtain the image data with its optical distortion having been corrected as in the case of double-buffer. In the case of single buffer, as compared to the case of double-buffer, the number of line memories in the internal memory, i.e., the capacity of memory can be reduced but the processing speed becomes slow.

THIRD EMBODIMENT

Figure 15:
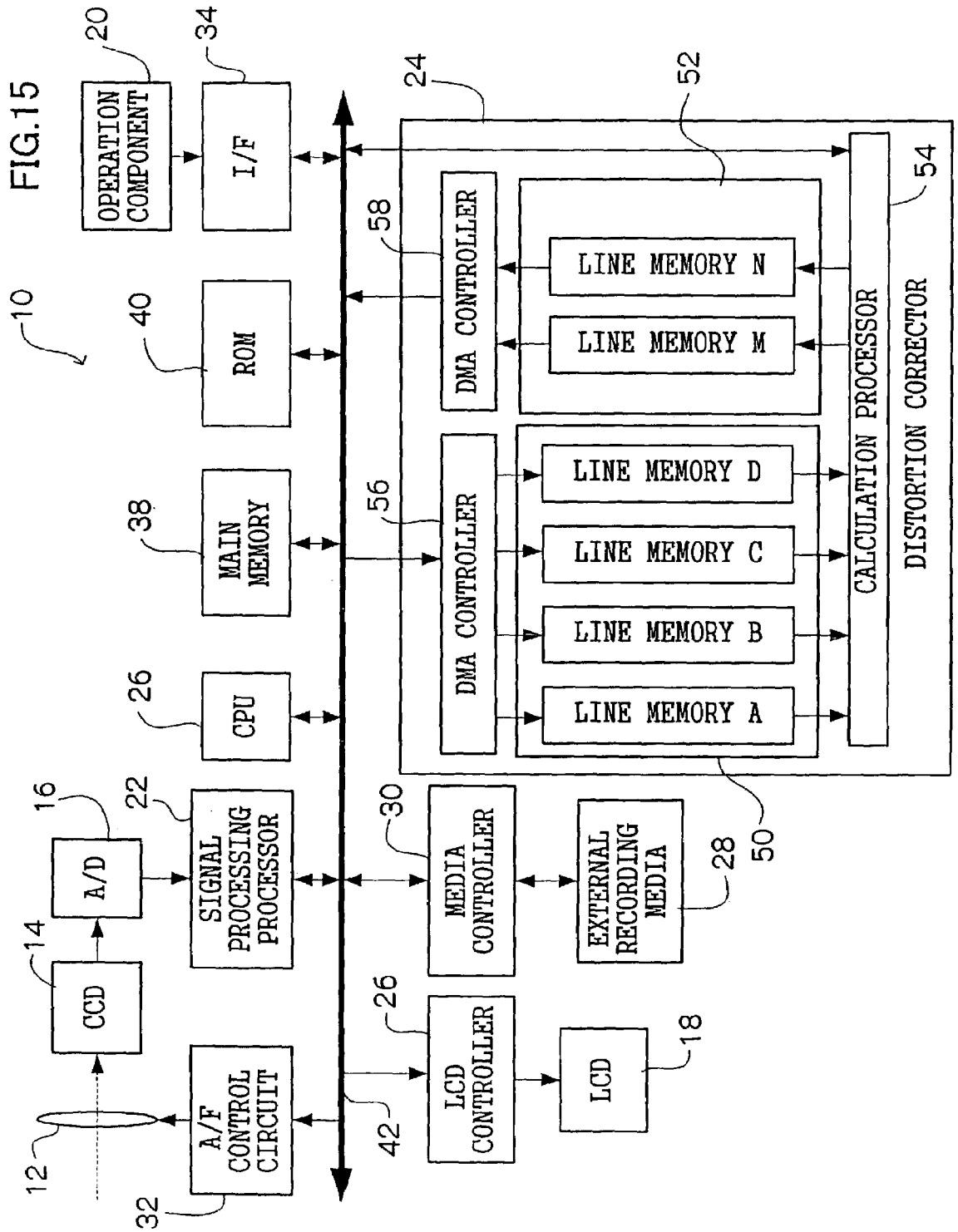
FIG. 15 is a block diagram illustrating the structure of a digital camera relating to a third embodiment.

The case of correcting an optical distortion by using the bi-linear interpolation according to the correction pattern 2 or 3 will be described in a third embodiment. FIG. 15 shows the detailed structure of the distortion corrector 24 under such case. The same reference numerals are attached to the same members as those of the first embodiment. Only the portion that will differ from the first embodiment will be described in detail in this embodiment.

As shown in FIG. 15, the internal memory 50 of the distortion corrector 24 is formed of four line memories A to D. The internal memory 52 of the distortion corrector 24 is formed of two line memories M and N.

As in the first embodiment, the DMA controller 58 DMA transfers the pixel data of the uncorrected image from the main memory 38. Input lines with their y direction coordinates (line numbers) being different by one with each other are written (stored) into the line memories A to D by switching the line memories for each of the input lines.

The calculation processor 54 calculates the corrected pixel data with the bi-linear interpolation by using the data stored in the line memories A to D as the uncorrected image data. The bi-linear interpolation is the same as in the first embodiment.

The DMA controller 58 DMA transfers the pixel data stored in the line memory M or N to the main memory 38 and writes the same therein as in the first embodiment.

The number of pixels processed, the number of pixels inputted and the correction processing order are the same as those of the first embodiment.

Next, the operations of the distortion corrector 24 with the above-described structure will be described. The processing of the calculation processor 54 is basically the same as in FIG. 9 except that the interpolation method is changed. The operations of the respective sections in the distortion corrector 24 will be described with reference to FIG. 16. Settings for the DMA transfer are performed in advance by the calculation processor 54 upon the DMA controllers 56 and 58.

Figure 16:
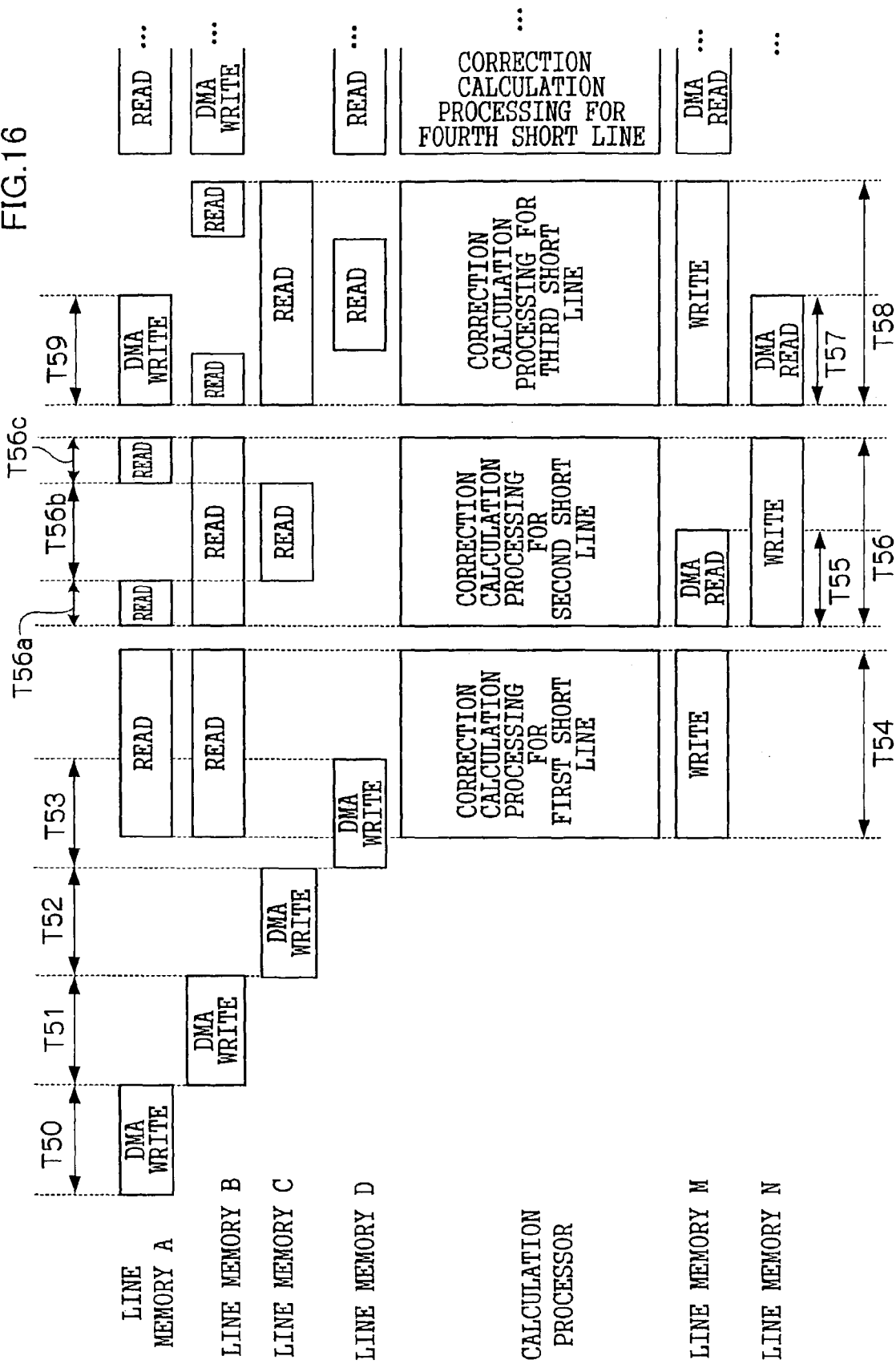
FIG. 16 is a timing chart illustrating the operations of respective sections of a distortion corrector of the third embodiment.

As shown in FIG. 16, the DMA controller 56 firstly reads a part of the uncorrected image data corresponding to the predetermined number of pixels on the main memory 38 with continuous addresses (one input line), DMA transfers the data to the line memory A and writes the same therein (time interval T50).

When the transfer to the line memory A ends, the DMA controller 56 similarly DMA transfers the next input line to the line memory B and writes the same therein (time interval T51). When the transfer to the line memory B ends, the next input line is further DMA transferred to the line memory C and written therein (time interval T52). When the transfer to the line memory C ends, the next input line is DMA transferred to the line memory D and written therein (time interval T53). As a result, the line data with their line numbers being different by one with each other is written into the line memories A to D, respectively.

In the distortion corrector 24, when the pixel data corresponding to the first three input lines is accumulated in the line memories, the calculation processor 54 starts the correction calculation processing for an optical distortion upon a first short line 74 (time interval T54) Because the correction calculation processing is the same as in the first embodiment, the detailed description thereof will be omitted.

Results of the correction calculation processing for pixels on the first short line 74 are successively written into the line memory M. When the pixel data P calculated by the expression (3) is written into the line memory M by the predetermined number of pixels processed, it is considered that correction for the first short line 74 is completed. Then, the DMA controller 58 reads the pixel data in the line memory M and DMA transfers the data to the main memory 38 (time interval T55).

The calculation processor 54 continues the correction calculation processing during the above-described operation. When the data written into the line memory D reaches the predetermined number of pixels (one input line), the line memory at the writing end is switched to another line memory (i.e., the line memory N). Then, correction for a second short line 74 is similarly performed (time interval T56*a*).

If the address corresponding to the calculated coordinate does not exist in the set of line memories that is being accessed as the reading end (i.e., the line memories A and B) during the correction calculation processing for the same short line 74, the calculation processor 54 switches the line memory to be accessed as the reading end from the line memory that corresponds to the older line number among line memories being accessed (specifically, the line memory A) to the line memory that corresponds to the next line number among line memories that are not accessed (specifically, the line memory C). Then, correction for the second short line 74 continues to be performed (time interval T56*b*).

Figure 17A:
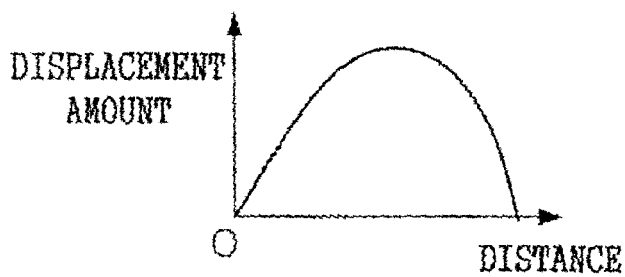
FIG. 17A is a conceptual diagram illustrating a displacement amount with respect to the distance from an optical center when a correction pattern 2 or 3 is used.
Figure 17B:
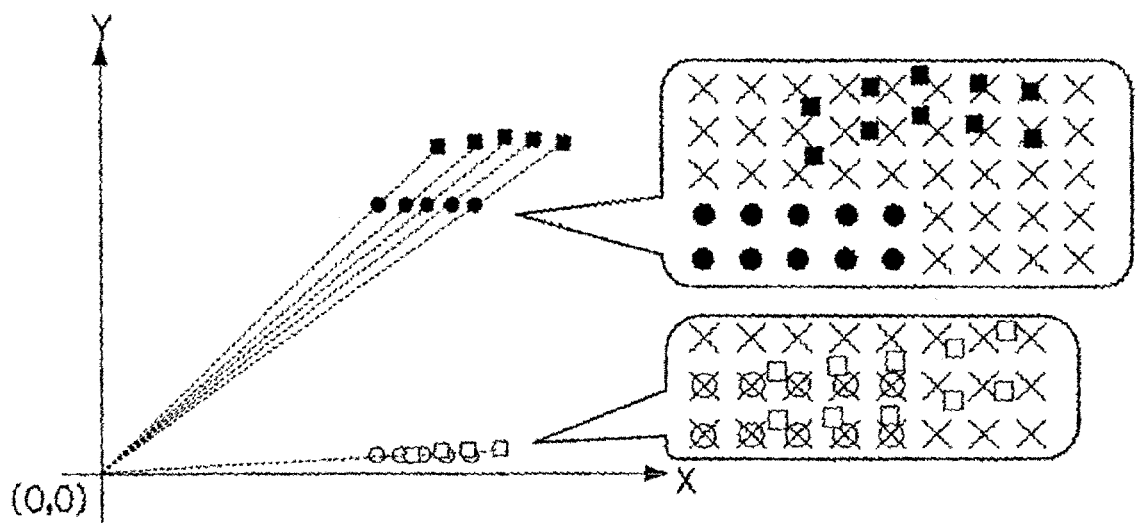
FIG. 17B is a conceptual diagram illustrating the correspondence relationship between positions of pixels on an image with its spool type optical distortion not having been corrected and those of pixels on an image with its spool type optical distortion having been corrected when the correction pattern 2 or 3 is used.
Figure 17C:
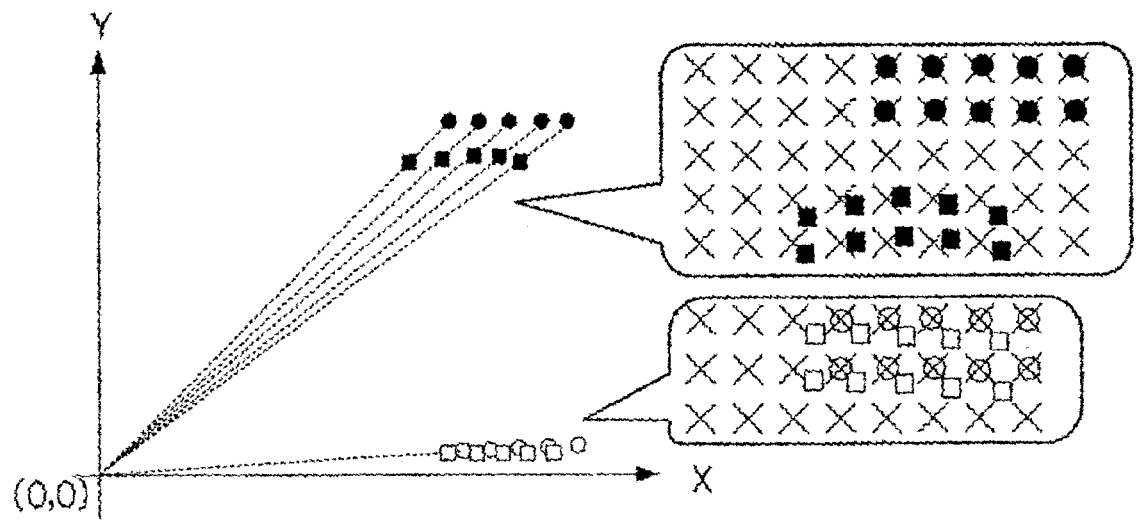
FIG. 17C is a conceptual diagram illustrating the correspondence relationship between positions of pixels on an image with its barrel type optical distortion not having been corrected and those of pixels on an image with its barrel type optical distortion having been corrected when the correction pattern 2 or 3 is used.

In the case of the correction pattern 2 or 3, as shown in FIG. 17A, the displacement amount (correction amount) of a pixel in the middle of a short line 74 has the maximum value. For this reason, in both of the cases of the spool type optical distortion shown in FIG. 17B and the barrel type optical distortion shown in FIG. 17C, the data for the input line with the line number which is switched from access to non-access may be required again during the correction for the same short line 74 being continuously performed. When the optical distortion is corrected according to the correction pattern 2 or 3, the data corresponding to three input lines must be always held during the processing for one short line 74. Accordingly, according to this embodiment, during the processing for the same short line 74, the DMA controller 56 is not instructed to transfer the next input line even if the memory change is performed.

Then, when the address corresponding to the calculated coordinate returns in the set of line memories that was accessed before as the reading end, the calculation processor 54 returns the line memories to be accessed as the reading end to the corresponding original set of line memories. Then, correction for the second short line 74 continues to be performed (time interval T56*c*). Correction for the second short line 74 is performed during the time interval T56 (=T56*a*+T56*b*+T56*c*).

When the pixel data P is written into the line memory N by the predetermined number of pixels processed, it is considered that correction for the second short line 74 is completed. Then, the DMA controller 58 reads the pixel data in the line memory N and DMA transfers the data to the main memory 38 (time interval T57). Similarly, the correction calculation processing for a third short line 74 starts (time interval T58).

At the time when the correction calculation processing for the next short line 74 (i.e., the third short line) starts, if the address corresponding to the coordinate calculated for correction for the first pixel does not exist in the set of line memories that has been accessed as the reading end (i.e., line memories A and B), the calculation processor 54 switches the line memory to be accessed as the reading end from the line memory that corresponds to the older line number among the line memories that are being accessed (specifically, the line memory A) to the line memory that corresponds to the next line number among line memories that are not accessed (specifically, the line memory C) (memory change).

At the same time of this memory change, the DMA controller 56 newly DMA transfers the next input line from the main memory 38 to the line memory which is not accessed now because of the memory change (specifically, the line memory A) and overwrites the line thereon (time interval T59).

The same processings as the above-described processings are repeated for a third short line 74, a fourth short line 74 . . . and thus correction for one strip region 72 is performed. Such processings are performed for all strip regions 72 and thus the corrected image data with its optical distortion having been corrected is stored in the main memory 38.

In the above-described distortion corrector 24, double buffers are used for DMA transfer for input/output in order to increase a speed. The line memories D and N may be omitted and DMA transfer may be performed by a single buffer as shown in FIG. 18.

Figure 18:
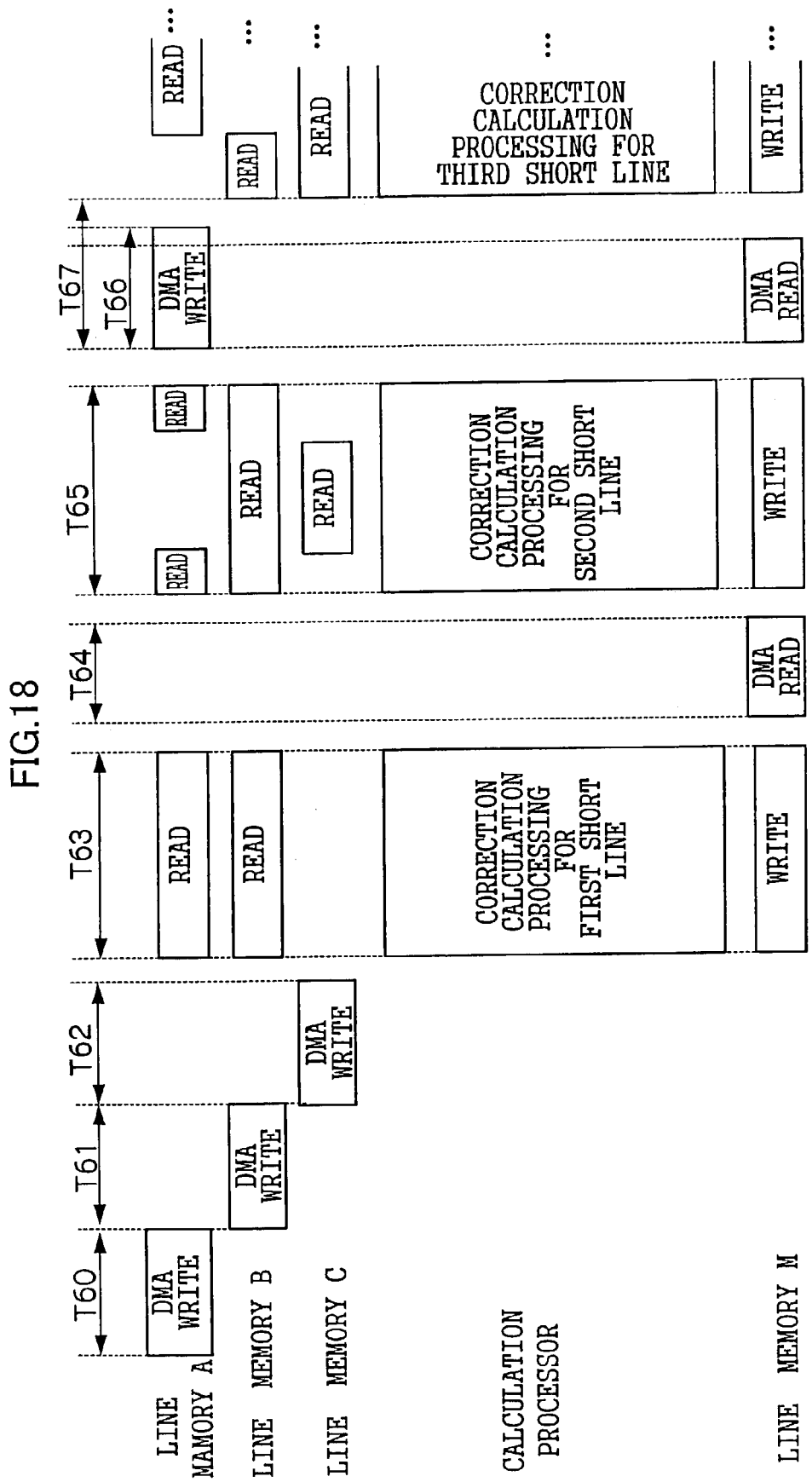
FIG. 18 is a timing chart illustrating the operations of the respective sections of the distortion corrector relating to a modified example of the third embodiment (in the case of single buffer).

Namely, as shown in FIG. 18, the DMA controller 56 firstly reads a part of the uncorrected image data on the main memory 38 by the predetermined number of pixels with continuous addresses (one input line), DMA transfers the data to the line memory A and writes the same therein (time interval T60).

When the transfer to the line memory A ends, the DMA controller 56 similarly DMA transfers the next input line to the line memory B and writes the line therein (time interval T61). When the transfer to the line memory B ends, the next input line is DMA transferred to the line memory C and written therein (time interval T62). As a result, line data with their line numbers being different by one with each other is written into the line memories A to C, respectively.

When the pixel data corresponding to three input lines is accumulated in the line memories, the calculation processor 54 starts the correction calculation processing for an optical distortion upon a first short line 74. As in the case of double-buffer, the result of calculation is written into the line memory M (time interval T63).

When the pixel data P corresponding to the predetermined number of pixels processed is written into the line memory M, it is considered that correction for the first short line 74 is completed. Then, DMA controller 58 reads the pixel data in the line memory M and DMA transfers the data to the main memory 38 (time interval T64).

When the DMA transfer to the main memory 38 ends, the calculation processor 54 starts the correction calculation processing for an optical distortion upon a second short line 74. The result of calculation is similarly written into the line memory M (time interval T65). Memory change during the correction calculation processing is appropriately performed as in the case of double-buffer.

When the pixel data P corresponding to the predetermined number of pixels processed is written into the line memory M, it is considered that correction for the second short line 74 is completed. Then, the DMA controller 58 reads the pixel data in the line memory M and DMA transfers the data to the main memory 38 (time interval T66). Then, the correction calculation processing for the next short line 74, i.e., the third short line 74 starts.

When memory change is performed in the correction calculation processing upon the first pixel on the next short 74 (the third short line 74), after the correction calculation processing for the previous short line 74, the DMA controller 56 newly DMA transfers the next input line from the main memory 38 and overwrites the line on the line memory which is not accessed now because of the memory change (specifically, the line memory A) (time interval T67).

The same processings as the above-described processings are repeated for the third short line 74, a fourth short line 74 . . . and thus correction for one strip region 72 is performed. Such processings are performed for all strip regions 72 and thus the corrected image data with its optical distortion having been corrected is stored in the main memory 38.

In this way, a single buffer can obtain the image data with its optical distortion having been corrected as in the case of double-buffer. In the case of single buffer, as compared to the case of double-buffer, the number of line memories in the internal memory, i.e., the capacity of memory can be reduced but a processing speed becomes slow.

As described in the above first to third embodiments, an image is divided into four quadrants 70A to 70D. Each of the quadrants 70A to 70D is further divided into strips. Within each of the strip regions 72, the correction processing is successively performed from a short line 74 which is closest to the optical center. An optical distortion can be easily corrected regardless of the types of the correction patterns and the interpolation methods. Further, the required capacity of the internal memory can be reduced as compared to conventional cases.

As seen from the first and second embodiments, the calculation is more complicated in the case of using the bi-linear interpolation than the case of using the nearest neighbor interpolation, as shown in the expression (3). Thus, a processing time required for the correction processing is longer. The number of line memories required for the internal memory 50, i.e., the capacity of the internal memory 50 is increased. As a result, production costs are increased. Nevertheless, it is generally known that the bi-linear interpolation can realize an image (corrected image) with higher quality than the nearest neighbor interpolation.

In the case of using the nearest neighbor interpolation, a processing time required for the correction processing is shorter. Further, the capacity of memory in the internal memory 50 is less. Nevertheless, the quality of the corrected image may be degraded. Although a description is omitted, when the cubic convolution interpolation is used as the interpolation method, the calculation is more complicated than the case of the bi-linear interpolation. Thus, a processing time becomes longer. Nevertheless, the corrected image has higher quality.

The trade off relationship is established between the quality of the corrected image, the processing time and the production cost depending on the interpolation method. Thus, the interpolation method may be appropriately selected according to the quality of the corrected image, the processing time and the production cost to be realized.

When an optical distortion is corrected according to the correction pattern 1, the correction is performed so that a peripheral portion is attracted in the direction of the optical center. Thus, pixel data which does not exist in uncorrected image data is required. As a result, there arise drawbacks in that corners of the image are altered by the correction processing and the quality of the corrected image may be decreased. As seen from the first and third embodiments, however, the number of input lines required for processing one short line 74 is not three but two. Namely, when the same interpolation method (bi-linear interpolation) is used, the capacity of memory in the internal memory 50 can be reduced as compared to the case of correcting an optical distortion by the correction pattern 2 or 3. Further, a reduction in costs can be accomplished.

When an optical distortion is corrected according to the correction pattern 2 or 3, the correction is performed while a peripheral portion is fixed. For this reason, pixel data other than the uncorrected image data is not required (or the number of pixels is small if required). As a result, the corners of the image are little altered. Nevertheless, the number of input lines required for processing one short line 74 may be three. Thus, the required capacity of memory in the internal memory 50 is increased and thus the production cost is also increased.

The trade-off relationship is also established between the quality of the corrected image and the production cost depending on the correction pattern. Thus, the correction pattern may be appropriately selected according to the quality of the corrected image and the production cost to be realized.

The case of setting the number of pixels processed corresponding to the width dimension of the strip region 72 (the short line 74) so that switching for input line occurs within once regardless of the position of the short line 74 within the corresponding strip region 72 (the distance from the optical center) has been described as an example in the first to third embodiments. Nevertheless, the invention is not limited to this case. As the acceptable number of switching for input line is increased, the number of line memories required for the internal memory 50 is also increased. Thus, it is the most preferable that the number of switching is one as described above.

What is claimed is:

1. A correction method comprising the steps of:
    dividing digital image data, which indicates a subject image photographed via an optical lens and in which a plurality of pixel rows each of which includes a plurality of pixels arranged in a line direction are arranged in an orthogonal direction orthogonal to the line direction, into four quadrants by an axis in the line direction and an axis in the orthogonal direction which pass through an optical center corresponding to a center of the optical lens, dividing each of the quadrants into a plurality of strip regions by a plurality of lines in the orthogonal direction, and correcting an optical distortion successively from a pixel row which is closest to the axis in the line direction or a pixel row which is furthest from the axis in the line direction for each of the strip regions; and
    performing data transfer with an image data storing component, which stores the digital image data, according to a corresponding correction order for each of pixels arranged continuously in the line direction, wherein
    when the optical distortion is a spool type optical distortion, correction is performed so as to use a predetermined number of pixel rows which include an uncorrected pixel further from the optical center than a corrected pixel row within the strip region, and
    when the optical distortion is a barrel type optical distortion, correction is performed so as to use a predetermined number of pixel rows which include an uncorrected pixel closer to the optical center than a corrected pixel row within the strip region.

2. The correction method according to claim 1, wherein when the optical distortion is a spool type optical distortion, correction is successively performed, for each of the strip regions, from a pixel row closest to the axis in the line direction to a pixel row furthest from the axis in the line direction, and when the optical distortion is the barrel type optical distortion, correction is successively performed, for each of the strip regions, from a pixel row furthest from the axis in the line direction to a pixel row closest to the axis in the line direction.

3. The correction method according to claim 1, wherein within each pixel row in the strip region, correction is successively performed from a pixel closest to the optical center.

4. The correction method according to claim 1, wherein when the optical distortion is the spool type optical distortion, correction is successively performed from a strip region which is closest to the optical center within each of the quadrants, and when the optical distortion is the barrel type optical distortion, correction is successively performed from a strip region which is furthest from the optical center within each of the quadrants.

5. The correction method according to claim 1, wherein a polynomial expression which does not include a term in which variable is of an odd order is used as a polynomial expression which approximates the optical distortion.

6. The correction method according to claim 1, wherein the optical distortion is corrected by interpolating pixels of corrected digital image data with uncorrected digital image data, and one of nearest neighbor interpolation, bi-linear interpolation and cubic convolution interpolation is used as an interpolation method.

7. The correction method according to claim 1, wherein one of a correction pattern in which correction is performed so that the optical center is fixed and a peripheral portion is moved in the digital image data and a correction pattern in which correction is performed so that an intermediate portion between the optical center and the peripheral portion or the peripheral portion is fixed and an optical center side is moved in the digital image data is used.

8. The correction device comprising:
    a correction component which divides digital image data, which indicates a subject image photographed via an optical lens and in which a plurality of pixel rows each of which includes a plurality of pixels arranged in a line direction are arranged in an orthogonal direction orthogonal to the line direction, into four quadrants by an axis in the line direction and an axis in the orthogonal direction which pass through an optical center corresponding to a center of the optical lens, divides each of the quadrants into a plurality of strip regions by a plurality of lines in the orthogonal direction, and corrects an optical distortion successively from a pixel row which is closest to the axis in the line direction or a pixel row which is furthest from the axis in the line direction for each of the strip regions;
    an internal uncorrected data storing component which stores a predetermined number of pixel rows that include an uncorrected pixel and that is required for generating at least one corrected pixel row within the strip region, when the optical distortion is a spool type optical distortion, the uncorrected pixel is further from the optical center than the corrected pixel row within the strip region, and when the optical distortion is a barrel type optical distortion, the uncorrected pixel is closer to the optical center than the corrected pixel row within the strip region; and
    an uncorrected data transferring component which DMA direct memory access transfers uncorrected digital image data from an image data storing component, which stores the digital image data, to the internal uncorrected data storing component according to a correction order in which correction is performed by the correction component, for each of pixels continuously arranged in the line direction.

9. The correction device according to claim 8 further comprising:
    an internal corrected data storing component which stores corrected pixels continuously arranged in the line direction corresponding to at least one corrected pixel row within the strip region; and
    a corrected data transferring component which direct memory access transfers the corrected digital image data from the internal corrected data storing component to the image data storing component for each of pixels continuously arranged in the line direction.

10. The correction device according to claim 8, wherein the correction component successively performs correction, for each of the strip regions, from a pixel row closest to the axis in the line direction to a pixel row furthest from the axis in the line direction when the optical distortion is the spool type optical distortion, and successively performs correction, for each of the strip regions, from a pixel row furthest from the axis in the line direction to a pixel row closest to the axis in the line direction when the optical distortion is the barrel type optical distortion.

11. The correction device according to claim 8, wherein the correction component successively performs correction from a pixel closest to the optical center within each pixel row in the strip region.

12. The correction device according to claim 8, wherein the correction component successively performs correction from a strip region which is closest to the optical center within each of the quadrants when the optical distortion is spool type optical distortion, and successively performs correction from a strip region which is furthest from the optical center within each of the quadrants when the optical distortion is the barrel type optical distortion.

13. The correction device according to claim 8, wherein the correction component uses a polynomial expression which does not include a term in which variable is of an odd order as a polynomial expression which approximates the optical distortion.

14. The correction device according to claim 8, wherein the correction component corrects the optical distortion by interpolating pixels of corrected digital image data with uncorrected digital image data, and uses one of nearest neighbor interpolation, bi-linear interpolation and cubic convolution interpolation as an interpolation method.

15. The correction device according to claim 8, wherein the correction component uses one of a correction pattern in which correction is performed so that the optical center is fixed and a peripheral portion is moved in the digital image data and a correction pattern in which correction is performed so that an intermediate portion between the optical center and the peripheral portion or the peripheral portion is fixed and an optical center side is moved in the digital image data.

16. correction device which divides digital image data, which indicates a subject image photographed via an optical lens in which a plurality of pixel rows each of which includes a plurality of pixels arranged in a line direction are arranged in an orthogonal direction orthogonal to the line direction, into a plurality of strip regions by a plurality of lines in the orthogonal direction, and correcting an optical distortion for each of the strip regions, wherein
when the optical distortion is a spool type optical distortion, correction is performed so as to use a predetermined number of pixel rows which include an uncorrected pixel further from an optical center corresponding to a center of the optical lens than a corrected pixel row within the strip region, and
when the optical distortion is a barrel type optical distortion, correction performed so as to use a predetermined number of pixel rows which include an uncorrected pixel closer to the optical center than a corrected pixel row within the strip region.

17. The correction device according to claim 16, wherein the optical distortion is successively corrected from one end side of each of the strip regions toward another end side thereof for each of the strip regions.

18. The correction device according to claim 16, wherein:
the digital image data is divided into two areas by an axis in the line direction passing through the optical center;
each of the areas is divided into a plurality of the strip regions by a plurality of lines in the orthogonal direction; and
the optical distortion is corrected successively from a pixel row which is closest to the axis in the line direction or a pixel row which is furthest from the axis in the line direction for each of the strip regions.

19. The correction device according to claim 18, wherein the digital image data is divided into four quadrants by the axis in the line direction and an axis in the orthogonal direction which pass through the optical center, and each of the quadrants is divided into a plurality of the strip regions by a plurality of the lines.

20. The correction device according to claim 18, further comprising:
an internal uncorrected data storing component which stores uncorrected pixels required for generating at least one corrected pixel row within the strip region; and
an uncorrected data transferring component which transfers the uncorrected digital image data from an image data storing component, which stores uncorrected digital image data, to the internal uncorrected data storing component according to a correction order in which correction is performed, for each of pixels continuously arranged in the line direction.

21. A photographing device comprising:
the correction device according to claim 16;
an optical lens which images a subject image; and
an image data storing component which stores the digital image data.

* * * * *